(12) United States Patent
Hwang

(10) Patent No.: US 11,453,755 B2
(45) Date of Patent: Sep. 27, 2022

(54) ENVIRONMENT-FRIENDLY HEAT SHIELDING FILM USING NON-RADIOACTIVE STABLE ISOTOPE AND MANUFACTURING METHOD THEREOF

(71) Applicant: Tai-Gyeong Hwang, Busan (KR)

(72) Inventor: Tai-Gyeong Hwang, Busan (KR)

( * ) Notice: Subject to any disclaimer, the term of this patent is extended or adjusted under 35 U.S.C. 154(b) by 0 days.

(21) Appl. No.: 16/977,747

(22) PCT Filed: Feb. 21, 2020

(86) PCT No.: PCT/KR2020/002569
§ 371 (c)(1),
(2) Date: Sep. 2, 2020

(87) PCT Pub. No.: WO2020/218725
PCT Pub. Date: Oct. 29, 2020

(65) Prior Publication Data
US 2021/0246278 A1    Aug. 12, 2021

(30) Foreign Application Priority Data
Apr. 22, 2019  (KR) .......................... 10-2019-0046452

(51) Int. Cl.
*C08J 7/06*     (2006.01)
*C09J 7/29*     (2018.01)
(Continued)

(52) U.S. Cl.
CPC .............. *C08J 7/06* (2013.01); *B01J 6/001* (2013.01); *C01G 41/02* (2013.01); *C08J 5/18* (2013.01);
(Continued)

(58) Field of Classification Search
CPC .. C01G 41/02; C08K 2003/2258; C09D 5/32; G02B 5/003; G02B 5/208; G02B 5/22
See application file for complete search history.

(56) References Cited

U.S. PATENT DOCUMENTS

| | | | | |
|---|---|---|---|---|
| 3,505,108 A | * | 4/1970 | Mochel ................... | C03C 17/25 428/433 |
| 2006/0178254 A1 | * | 8/2006 | Takeda ..................... | C09D 5/32 501/1 |
| 2021/0047518 A1 | * | 2/2021 | Tsunematsu ............. | C08K 3/22 |

FOREIGN PATENT DOCUMENTS

| | | |
|---|---|---|
| JP | H08-073223 A | 3/1996 |
| JP | 2006-299086 A | 11/2006 |

(Continued)

OTHER PUBLICATIONS

Commission on Isotopic Abundances and Atomic Weights, Caesium, found at https://ciaaw.org/caesium.htm (2015).*

(Continued)

*Primary Examiner* — Kregg T Brooks
(74) *Attorney, Agent, or Firm* — Workman Nydegger

(57) ABSTRACT

Disclosed are an environment-friendly heat shielding film using a non-radioactive stable isotope and a manufacturing method therefor and, more specifically, an environment-friendly heat shielding film using a non-radioactive stable isotope and a manufacturing method therefor, wherein a heat shielding layer is formed on one surface of a substrate layer; the heat shielding layer is composed of stable isotopes as elements constituting a precursor and contains a non-radioactive stable isotope tungsten bronze compound having an oxygen-deficient $^{(?)}A_x^{(182,183,184,186)}W_1O_{(3-n)}$ type hexagonal structure, thereby preventing the generation of radioactive materials, fundamentally blocking haze, and improving the visible light transmittance and the infrared light blocking rate; and the heat resistance and durability problems that may occur when the heat shielding layer is formed of the non-radioactive stable isotope tungsten bronze compound are solved by a passivation film.

8 Claims, 12 Drawing Sheets

(51) Int. Cl.
| | |
|---|---|
| C09J 7/40 | (2018.01) |
| B01J 6/00 | (2006.01) |
| C01G 41/02 | (2006.01) |
| C08J 5/18 | (2006.01) |
| C23C 22/78 | (2006.01) |
| C23C 22/83 | (2006.01) |
| C09D 5/32 | (2006.01) |
| C08K 3/22 | (2006.01) |

(52) U.S. Cl.
CPC ................... *C09D 5/32* (2013.01); *C09J 7/29* (2018.01); *C09J 7/40* (2018.01); *C23C 22/78* (2013.01); *C23C 22/83* (2013.01); *C01P 2002/34* (2013.01); *C01P 2006/37* (2013.01); *C01P 2006/60* (2013.01); *C08J 2367/02* (2013.01); *C08K 2003/2258* (2013.01)

(56) References Cited

FOREIGN PATENT DOCUMENTS

| | | |
|---|---|---|
| JP | 2009-271515 A | 11/2009 |
| KR | 10-2010-0031004 A | 3/2010 |
| KR | 10-2012-0107060 A | 9/2012 |
| KR | 10-2036253 B1 | 10/2019 |

OTHER PUBLICATIONS

Commission on Isotopic Abundances and Atomic Weights, Tungsten, found at https://ciaaw.org/tungsten.htm (2015).*

International Search Report dated Jun. 9, 2020, issued in PCT/KR2020/002569, filed Feb. 21, 2020.

Written Opinion dated Jun. 9, 2020, issued in PCT/KR2020/002569, filed Feb. 21, 2020.

Distribution of Radioactivities of 226, 228 Ra, 137 Cs and 40 K in Soil in Busan Area, The Korean Association for Radiation Protection, vol. 26 No. 4: 441-445 (2001).

The Effect of Natural Radioactive Elements in the Soil and Ground Water toward Human Beings, Appl Sci Uni J. vol. 5 No. 1 Jan. 2021.

International Union of Pure and Applied Chemistry, Commission on isotopic abundances and atomic weights: Frequent questions, https://www.ciaaw.org, accessed at least as early as Sep. 24, 2021.

International Union of Pure and Applied Chemistry, Commission on isotopic abundances and atomic weights: Natural Variations of Isotopic Abundances, https://www.ciaaw.org, accessed at least as early as Sep. 24, 2021.

International Union of Pure and Applied Chemistry, Commission on isotopic abundances and atomic weights: Isotopic Abundances, https://www.ciaaw.org, accessed at least as early as Sep. 24, 2021.

Burger et al. "Stable and radioactive cesium: A review about distribution in the environment, uptake and translocation in plants, plant reactions and plants' potential for bioremediation", Sci Total Environ (2017), https://doi.org/10.1016/j.scitotenv.2017.09.298.

Lourenço et al. "Rehabilitation of Radioactively Contaminated Soil: Use of Bioremediation/Phytoremediation Techniques", Springer International Publishing AG, part of Springer Nature 2019 D. K. Gupta, A. Voronina (eds.), Remediation Measures for Radioactively Contaminated Areas, https://doi.org/10.1007/978-3-319-73398-2_8.

Zhang et al. "Determination of the isotopic composition of tungsten using MC-ICPMS", Elsevier B.V.(2019), https://doi.org/10.1016/j.aca.2019.08.029.

Gad et al. "Cesium", Encyclopedia of Toxicology, vol. 1, Elsevier Inc. (2014), http://dx.doi.org/10.1016/B978-0-12-386454-3.00827-7.

* cited by examiner

ENVIRONMENT-FRIENDLY HEAT SHIELDING FILM USING NON-RADIOACTIVE STABLE ISOTOPE AND MANUFACTURING METHOD THEREOF

BACKGROUND OF THE INVENTION

1. Field of the Invention

The present disclosure relates to an environment-friendly heat shielding film using a non-radioactive stable isotope and a manufacturing method therefor and, more specifically, to an environment-friendly heat shielding film using a non-radioactive stable isotope and a manufacturing method therefor, wherein the prevention of radioactive material generation, the fundamental blocking of haze, and improvement of the visible light transmittance and the infrared light blocking rate can be attained by forming a heat shielding layer on one surface of a substrate layer and configuring the heat shielding layer such that elements constituting a precursor are stable isotopes and a non-radioactive stable isotope tungsten bronze compound having an oxygen-deficient $^{(Y)}A_x^{(182,183,184,186)}W_1O_{(3-n)}$ type hexagonal structure is contained; and the heat resistance and durability problems that may occur when the heat shielding layer is formed of the non-radioactive stable isotope tungsten bronze compound are solved by a passivation film.

2. Description of the Prior Art

In a case where the number of protons inside the nucleus of an atom is sufficiently large, the nucleus is prone to be unstable due to Coulomb repulsion, and therefore, such an atom tends to collapse into an atom having fewer protons by a natural principle for stabilization. This phenomenon results in radiation, including $\alpha$-rays, $\beta$-rays, and $\gamma$-rays.

The radioactive elements capable of emitting radiation include natural radioactive elements and artificial radioactive elements. The natural radioactive elements exist in nature, and about 60 species (atomic number 81 or higher) of natural radioactive elements are known. The artificial radioactive elements are produced by artificial methods, such as nuclear reaction and nuclear fission, and very many species of artificial radioactive elements exist.

Radioactivity refers to the activity of emitting radiation, and a material having radioactivity is called a radioactive material. Various problems may be caused when living organisms are exposed to such radioactive materials.

Meanwhile, a large portion of living organisms is composed of water, and water molecules may be ionized by radiation, and when water molecules are ionized, ions and free radicals are generated at a very great rate. The harmfulness of the ions is not great since large quantities of ions exist even in the natural state, but free radicals have very great activity, and thus may be involved in structural modifications of other molecules or produce hydrogen peroxide ($H_2O_2$), thereby causing toxicity. As a result, the free radicals act on systems associated with cell division, such as DNA and RNA, causing cell disruption, cell deformation, and the like.

The problem is that this radiation is occurring everywhere in the living environment. Since beryllium (Be), carbon (C), hydrogen (H), potassium (K), and radon (Rn), as well as high atomic number elements enabling nuclear power generation, emit radiation, the living organisms are inevitably exposed to a large amount of radiation in the course of daily life.

It is estimated that the amount at which the body is exposed to natural radiation yearly is about 3.08 mSv, of which 45.6% is due to radon, 33.8% is due to Earth's crust radiation, and 12.3% is due to food.

The radiation increases the risk thereof in proportion to the dose thereof since the exposure dose of radiation means energy. It has been reported that: abnormalities in the blood test may be caused at 100 mSv or more; fetal disorders, germ cell abnormalities, and infertility may be caused at 200 mSv or more; acute radiation syndrome may be caused at 1 Sv or more; and cataracts or the like may be caused at 2 Sv or more.

Heat shielding materials may be largely divided into organic compound type heat shielding materials and inorganic compound type heat shielding materials.

The organic compound type heat shielding materials show high visible light transmittance, but absorb only the vicinity of a single wavelength ($\approx$950 nm) in the near-infrared region, thereby making it difficult to effectively block the vicinity of the heat energy region actually felt by the human body, so that the organic compound type heat shielding materials have a relatively inferior shielding effect compared with the inorganic compound type materials. Therefore, the organic compound type heat shielding materials are used as auxiliary materials for heat shielding while being mixed with the inorganic compound type heat shielding materials. Examples of the organic compounds are lanthanum hexaboride ($LaB_6$), phthalocyanine ($P_C$), carbon black, titan black, a metal complex, a diimmonium salt, and the like. Out of these, the actually used organic compounds are a metal complex, carbon black, a diimmonium salt, and the like.

Whereas, the inorganic compound type heat shielding materials have low visible light transmittance, but have excellent durability and high heat shielding characteristics compared with the organic compound type materials. There are especially many inorganic oxides as heat shielding materials, and examples of such inorganic oxides include antimony tin oxide (ATO), indium tin oxide (ITO), silica dioxide ($SiO_2$), alumina trioxide ($Al_2O_3$), and molybdenum trioxide ($MoO_3$), niobium pentoxide ($Nb_2O_5$), vanadium pentoxide ($V2O_5$), tungsten bronze, and tungsten oxide. Out of these, especially, the inorganic oxides that are most frequently used and have favorable infrared light blocking characteristics are antimony tin oxide (ATO), indium tin oxide (ITO), and tungsten bronze.

Antimony tin oxide (ATO) is cheaper than indium tin oxide (ITO), and is widely applied to general heat shielding films. However, the antimony tin oxide (ATO) shows a transmission graph having a gentle slope at 1500 nm to 2200 nm in the near-infrared transmission peaks and cannot attain complete infrared light blocking, and the amount of antimony tin oxide (ATO) added is inevitably restricted to secure high visible light transmittance. In cases where the input amount of an antimony tin oxide (ATO) sol is increased to secure a high near-infrared light blocking rate, the visible light transmittance significantly drops to 40-50%, and the inclusion of excessive inorganic materials causes cracks, reduced adhesion, cloudiness, a change over time, and the like in the heat shielding coating layer. As such, even antimony tin oxide (ATO) with a particle size of 30 nm has a limitation in the infrared light blocking characteristics compared with visible light, and thus antimony tin oxide (ATO) has a narrow utilization range and cannot be easily applied in the manufacture of a high-performance heat shielding films.

Indium tin oxide (ITO) has high visible light transmittance and infrared light blocking characteristics compared with antimony tin oxide (ATO). However, indium is well known as a high-priced raw material in the world, and most of the electronics industries are developing a material that can replace indium tin oxide (ITO). In addition, using such an expensive raw material is also a large burden in the manufacture of heat shielding films. Therefore, there is an urgent need to develop a material having higher visible light transmittance and higher near-infrared light blocking characteristics than indium tin oxide (ITO).

In addition, antimony tin oxide (ATO) and indium tin oxide (ITO) are produced through very complicated processes in the synthesis of inorganic oxide nanoparticles. Especially, antimony tin oxide hydroxide (ATO(OH)) or indium tin oxide hydroxide (ITO(OH)) manufactured by a sol-gel method or an autoclave method essentially undergoes a firing process. Firing is conducted twice, wherein primary firing is conducted at 300-400° C. in air, and then secondary hydrogen reduction firing is conducted. The reduction firing carried out by mixing hydrogen gas and an inert gas requires attention since the introduction of only a tiny amount of oxygen greatly increases the risk of explosion, and the equipment, such as a gas flow firing furnace, is also very expensive. As described above, stability problems may be caused and expensive equipment needs to be invested for the preparation of antimony tin oxide (ATO) and indium tin oxide (ITO).

The perovskite tungsten bronze, which is a wide-band gap oxide, has a form in which a positive element, such as Na, is doped in tungsten trioxide, and generally has a perovskite structure ($ABO_3$). The tungsten bronze is actively being researched in a field requiring transparency since the tungsten bronze shows strong light energy absorption at a wavelength of 800 nm or more and a weak light energy absorption at a wavelength of 380-780 nm. Approximately 50,000 types of tungsten bronze compounds are known, and especially, a tungsten bronze compound showing infrared light blocking characteristics is in the form of $A_xW_1O_y$, in which $A_x$ is an alkali metal or alkali earth metal element, $W_1$ is tungsten, and $O_y$ is oxygen.

The inorganic compound type heat shielding materials may have crystal defects induced through calcination, reduction firing, or the like, for the expression of better optical characteristics, but the problem is that in these procedures, unwanted radioactive materials may be produced when unexpectedly extremely high energy is used during the synthesis process, such as microwave synthesis.

FIG. 1 shows a conventional heat shielding film, which is disclosed in Korean Patent Registration No. 10-1470901 (3 Dec. 2014).

Referring to FIG. 1, the conventional heat shielding film 90 includes: a substrate layer 91 having polyethylene terephthalate (PET) or polycarbonate (PC) as main materials; a coating layer 93 formed of a coating agent reflecting infrared light and absorbing heat deposited above the substrate layer 91; an adhesive layer 95 formed of an adhesive, which selectively shields ultraviolet light and infrared light and attached below the substrate layer 91; a thin film layer 97 formed of a thin film having visibility and shielding properties, which is further selectively deposited between the substrate layer 91 and the coating layer 93; and a protective layer 99 protecting a heat reflective film and delaminated before attachment, wherein the coating agent contains 5-40 wt % of antimony tin oxide (ATO) and 60-95 wt % of acrylic resin.

The conventional heat shielding film 90 also uses an inorganic compound as a heat shielding material, but the fact that radioactive materials may be detected due to the high energy applied to the inorganic compound is overlooked.

Eventually, the conventional heat shielding film 90 has the risk of radioactivity emission, and when the body is continuously exposed to the environment in which the heat shielding film 90 emitting radiation is used, cell deformation and cell disruption may be caused inside the body and the probability of mutation, fetal deformities, and cancer occurrence may also be increased.

Therefore, the related industry is requiring the development of a novel type of heat shielding film which effectively block infrared light distributed in the light of the sun, has no harmfulness through selective removal of harmful radioactive isotopes, has heat resistance and durability, and does not require a high cost for manufacturing through a simple manufacturing process.

(Patent Document 1) Korean Patent Registration No. 10-1470901 (3 Dec. 2014)

SUMMARY OF THE INVENTION

The present disclosure has been made in order to solve the above-mentioned problems in the prior art.

An aspect of the present disclosure is to provide an environment-friendly heat shielding film free of harmfulness of radioactivity by configuring a heat shielding film, formed on one surface of a substrate layer, of a non-radioactive stable isotope tungsten bronze compound.

Another aspect of the present disclosure is to provide a non-radioactive heat shielding film that prevents the generation of radioactive materials, by configuring elements, constituting a precursor, of non-radioactive stable isotopes and carrying out synthesis in conditions of a relatively low temperature and low energy state.

Still another aspect of the present disclosure is to prevent the occurrence of a particle size increase problem during a firing procedure in the preparation of a compound, by allowing a non-radioactive stable isotope tungsten bronze compound to have a relatively small primary particle size through the formation of an oxygen-deficient $^{(Y)}A_x^{(182,183,184,186)}W_1O_{(3-n)}$ type hexagonal structure.

Still another aspect of the present disclosure is to prevent the occurrence of a cloudy appearance in a finished heat shielding film due to scattering, by allowing the non-radioactive stable isotope tungsten bronze compound to form an oxygen-deficient $^{(Y)}A_x^{(182,183,184,186)}W_1O_{(3-n)}$ type hexagonal structure to thereby fundamentally block haze.

Still another aspect of the present disclosure is to provide a heat shielding film having an improved visible light transmittance and infrared light blocking rate, by allowing the non-radioactive stable isotope tungsten bronze compound to form an oxygen-deficient $^{(Y)}A_x^{(182,183,184,186)}W_1O_{(3-n)}$ type hexagonal structure to thereby maximize optical characteristics of an inorganic heat shielding material.

Still another aspect of the present disclosure is to provide a heat shielding film having uniform nano-sized particles, by preparing a non-radioactive stable isotope tungsten bronze compound through a liquid precipitation method having simple synthesis conditions to thereby easily control the particle generation and particle size.

Still another aspect of the present disclosure is to obtain nano-sized particles by calcining a non-radioactive stable isotope tungsten bronze hydrate in the range of 300-600° C. to minimize the growth of particles while completely removing hydroxyl groups and water molecules.

Still another aspect of the present disclosure is to obtain infrared light absorbing characteristics by carrying out reduction firing under the introduction of an inert gas to thereby form an oxygen-deficient $^{(Y)}A_x^{(182,183,184,186)}W_1O_{(3-n)}$ type hexagonal structure and more densely disposing non-radioactive alkaline metal elements or non-radioactive alkaline earth metal elements in oxygen vacancy sites.

Still another aspect of the present disclosure is to reduce the risk of work and conveniently carry out work through existing firing equipment by using an inert gas instead of hydrogen gas having a risk of explosion when reduction firing is conducted.

Still another aspect of the present disclosure is to resolve the problems with respect to heat resistance, durability, and the like of the non-radioactive stable isotope tungsten bronze compound, by forming an organic acid metallic chelate compound, which has precedence in selective reactivity and no heterogeneous reactivity, on the surface of the non-radioactive stable isotope tungsten bronze compound or distributing the organic acid metallic chelate compound in a dispersed sol, to thereby allow the organic acid metallic chelate compound to effectively block a reaction by the introduction of residual oxygen (O, $O_2$), a reaction by a residual hydroxyl group (—OH), a reaction by a residual radical, and the like.

Still another aspect of the present disclosure is to simply produce a compound suitable for a desired purpose in even an existing facility, by preparing an organic acid metallic chelate compound serving as a passivation film through a reflux method.

Still another aspect of the present disclosure is to solve a problem in that a substrate layer may be deformed due to the exposure to a temperature of 120° C. or higher when hot-air drying and ultraviolet irradiation are carried out for drying and curing of an applied coating film, by forming a substrate layer of polyethylene terephthalate having a high thermal deformation temperature and excellent dimensional stability.

Still another aspect of the present disclosure is to express sufficient optical characteristics by configuring the content of the non-radioactive stable isotope tungsten bronze compound in the dispersed sol to be 20-30 wt % and to prevent the deformation of a dispersant by reducing the time of dispersion.

Still another aspect of the present disclosure is to obtain a sufficient dispersed sol and prevent the defects in the coating surface due to the existence of an un-dried dispersant on the coating surface when the coated surface is dried by configuring the content of the dispersant in the dispersed sol to be 1-10 wt %.

Still another aspect of the present disclosure is to greatly improve heat resistance and durability of the non-radioactive stable isotope tungsten bronze compound without greatly degrading optical characteristics, such as visible light transmittance and infrared light blocking rate, by configuring the content of the organic acid metallic chelate compound in the dispersed sol to be 5-10 wt %.

Still another aspect of the present disclosure is to facilitate the dispersion of the agglomerated powder, conveniently form a dispersed sol, and enable mass production, by forming the dispersed sol via a ball milling method.

Still another aspect of the present disclosure is to enhance optical characteristics and coating adhesive strength of a film and improve surface scratch resistance by configuring the content of the dispersed sol in a coating sol to be 40-50 wt %.

Still another aspect of the present disclosure is to increase the binding strength between a coating sol and a substrate layer and precisely adjust the coating thickness by containing an oligomer, a monomer, and a photo-initiator, which correspond to a photopolymer and induce photo-polymerization by ultraviolet irradiation, in a coating sol.

Still another aspect of the present disclosure is to increase surface scratch resistance while maintaining optical characteristics, prevent the occurrence of surface cracks, and enhance adhesive strength with a substrate layer, by configuring the thickness of the coating film applied on the substrate layer to be 3-4 μm.

Still another aspect of the present disclosure is to facilitate the attachment of a film to a building, a vehicle, or the like, by configuring an adhesive layer on one surface of a heat shielding layer.

Still another aspect of the present disclosure is to protect one surface of an adhesive layer through a release paper by attaching the release paper to one surface of the adhesive layer.

The present disclosure is implemented by embodiments configured as follows to accomplish the above aspects.

According to an embodiment of the present disclosure, an environment-friendly heat shielding film using a non-radioactive stable isotope includes: a substrate layer; and a heat shielding layer formed on one surface of the substrate layer, wherein the heat shielding layer contains a non-radioactive stable isotope tungsten bronze compound.

According to another embodiment of the present disclosure, the non-radioactive stable isotope tungsten bronze compound is deficient in oxygen.

According to still another embodiment of the present disclosure, the non-radioactive stable isotope tungsten bronze compound forms a $^{(Y)}A_x^{(182,183,184,186)}W_1O_{(3-n)}$ type hexagonal structure.

According to still another embodiment of the present disclosure, the $^{(Y)}A$ is a non-radioactive alkali metal element or a non-radioactive alkali earth metal element.

According to still another embodiment of the present disclosure, the $^{(Y)}A$ is any one of $^{(23)}Na$, $^{(39,41)}K$, $^{(85)}Pb$, $^{(133)}Cs$, $^{(24,25,26)}Mg$, and $^{(42,43,44)}Ca$.

According to still another embodiment of the present disclosure, the non-radioactive stable isotope tungsten bronze compound is formed in an amorphous form by calcining a non-radioactive stable isotope tungsten bronze hydrate in the range of 300-600° C. to remove hydroxyl groups and water molecules.

According to still another embodiment of the present disclosure, after the calcining, the non-radioactive stable isotope tungsten bronze compound forms an oxygen-deficient $^{(Y)}A_x^{(182,183,184,186)}W_1O_{(3-n)}$ type hexagonal structure by reduction firing through the introduction of an inert gas.

According to still another embodiment of the present disclosure, the inert gas includes at least one of $N_2$, Ar, Ne, and $CO_3$.

According to still another embodiment of the present disclosure, the heat shielding layer further includes a passivation film for improving heat resistance and durability of the oxygen-deficient non-radioactive stable isotope tungsten bronze compound.

According to still another embodiment of the present disclosure, the passivation film contains an organic acid metal chelate compound.

According to still another embodiment of the present disclosure, the organic acid metal chelate compound has a structure of R1-M-R2 in which M is any one element of Cu, Ag, Zn, Ni, W, and Co; and R1 and R2 each are any one of low-molecular weight type glutamic acid and high-molecular weight type sodium polyaspartate.

According to still another embodiment of the present disclosure, the substrate layer is formed of polyethylene terephthalate.

According to still another embodiment of the present disclosure, a method for manufacturing an environmental-friendly heat shielding film includes: a substrate layer providing step of providing a substrate layer; and a heat shielding layer forming step of, after the substrate layer providing step, forming, on one surface of the substrate layer, a heat shielding layer containing a non-radioactive stable isotope tungsten bronze compound.

According to still another embodiment of the present disclosure, the heat shielding layer forming step includes: a non-radioactive compound forming step of forming a non-radioactive stable isotope tungsten bronze compound; a passivation film forming step of, after the non-radioactive compound forming step, forming a passivation film on the non-radioactive stable isotope tungsten bronze compound; and a coating step of, after the passivation film forming step, forming a coating film on the substrate layer.

According to still another embodiment of the present disclosure, the non-radioactive compound forming step includes: a synthesizing step of synthesizing a non-radioactive stable isotope tungsten bronze hydrate by liquid precipitation; a primary calcining step of, after the synthesizing step, calcining the non-radioactive stable isotope tungsten bronze hydrate in the range of 300-600° C. to remove hydroxyl groups and water molecules and to form an amorphous form; and a secondary reduction firing step of, after the primary calcining step, carrying out reduction firing under the introduction of an inert gas in order to form an oxygen-deficient $^{(Y)}A_x^{(182,183,184,186)}W_1O_{(3-n)}$ type hexagonal structure.

According to still another embodiment of the present disclosure, the passivation film forming step includes: an organic acid metal chelate compound preparing step of preparing an organic acid metal chelate compound; and a dispersed sol forming step of, after the organic acid metal chelate compound preparing step, forming a dispersed sol.

According to still another embodiment of the present disclosure, in the organic acid metal chelate compound preparing step, a precursor containing a transition metal is dissolved in an organic acid solvent, and refluxed by agitation at 60-80° C. for 4-5 hours.

According to still another embodiment of the present disclosure, in the dispersed sol forming step, a dispersed sol containing 20-30 wt % of a non-radioactive stable isotope tungsten bronze compound, 1-10 wt % of a dispersant, and 5-10 wt % of an organic acid metal chelate compound is formed.

According to still another embodiment of the present disclosure, the coating step includes: a coating sol forming step of forming a coating sol; a coating sol applying step of, after the coating sol forming step, applying the coating sol on the substrate layer; a drying and curing step of, after the coating sol applying step, subjecting the substrate layer having the coating sol applied thereto to hot-air drying and ultraviolet curing.

According to still another embodiment of the present disclosure, in the coating sol forming step, a coating sol containing 40-50 wt % of a dispersed sol, 40-50 wt % of a binder, and 10-20 wt % of an organic solvent is formed.

According to still another embodiment of the present disclosure, the binder is a photopolymer and contains an oligomer, a monomer; and a photo-initiator, which induce photo-polymerization by ultraviolet irradiation.

According to still another embodiment of the present disclosure, the organic solvent includes at least one of methyl ethyl ketone, toluene, ethyl acetate, iso-propyl alcohol, ethyl cellosolve, iso-butyl alcohol, dimethylformamide, ethanol, butyl cellosolve, xylene, 1-octanol, and diethylene glycol, nitrobenzene.

According to still another embodiment of the present disclosure, in the coating sol applying step, any one of micro gravure coating, knife coating, and roll-to-roll coating is used.

According to still another embodiment of the present disclosure, in the coating sol applying step, the thickness of a coating film is 3-4 μm.

According to still another embodiment of the present disclosure, the method further includes an adhesive layer forming step of, after the heat shielding layer forming step, forming an adhesive layer on one surface of the heat shielding layer.

According to still another embodiment of the present disclosure, the method further includes a release paper attaching step of, after the adhesive layer forming step, attaching a release paper on one surface of the adhesive layer.

The present disclosure can obtain the following effects based on the above embodiments and the configurations, combinations and relations that will be described later.

The present disclosure has an effect of providing an environment-friendly heat shielding film free of harmfulness of radioactivity by configuring a heat shielding film, formed on one surface of a substrate layer, of a non-radioactive stable isotope tungsten bronze compound.

The present disclosure induces an effect of providing a non-radioactive heat shielding film that prevents the generation of radioactive materials, by configuring elements, constituting a precursor, of non-radioactive stable isotopes and carrying out synthesis in conditions of a relatively low temperature and low energy state.

The present disclosure has an effect of preventing the occurrence of a particle size increase problem during a firing procedure in the preparation of a compound, by allowing a non-radioactive stable isotope tungsten bronze compound to have a relatively small primary particle size through the formation of an oxygen-deficient $^{(Y)}A_x^{(182,183,184,186)}W_1O_{(3-n)}$ type hexagonal structure.

The present disclosure has an effect of preventing the occurrence of a cloudy appearance in a finished heat shielding film due to scattering, by allowing the non-radioactive stable isotope tungsten bronze compound to form an oxygen-deficient $^{(Y)}A_x^{(182,183,184,186)}W_1O_{(3-n)}$ type hexagonal structure to thereby fundamentally block haze.

The present disclosure induces an effect of providing a heat shielding film having an improved visible light transmittance and infrared light blocking rate, by allowing the non-radioactive stable isotope tungsten bronze compound to form an oxygen-deficient $^{(Y)}A_x^{(182,183,184,186)}W_1O_{(3-n)}$ type hexagonal structure to thereby maximize optical characteristics of an inorganic heat shielding material.

The present disclosure has an effect of providing a heat shielding film having uniform nano-sized particles, by preparing a non-radioactive stable isotope tungsten bronze compound through a liquid precipitation method having simple synthesis conditions to thereby easily control the particle generation and particle size.

The present disclosure has an effect of obtaining nano-sized particles by calcining a non-radioactive stable isotope tungsten bronze hydrate in the range of 300-600° C. to minimize the growth of particles while completely removing hydroxyl groups and water molecules.

The present disclosure induces an effect of having infrared light absorbing characteristics by carrying out reduction firing under the introduction of an inert gas to thereby form an oxygen-deficient $^{(\eta)}A_x^{(182,183,184,186)}W_1O_{(3-n)}$ type hexagonal structure and more densely disposing non-radioactive alkaline metal elements or non-radioactive alkaline earth metal elements in oxygen vacancy sites.

The present disclosure has an effect of reducing the risk of work and conveniently carrying out work through existing firing equipment by using an inert gas instead of hydrogen gas having a risk of explosion when reduction firing is conducted.

The present disclosure has an effect of resolving the problems with respect to heat resistance, durability, and the like of the non-radioactive stable isotope tungsten bronze compound, by forming an organic acid metallic chelate compound, which has precedence in selective reactivity and no heterogeneous reactivity, on the surface of the non-radioactive stable isotope tungsten bronze compound or distributing the organic acid metallic chelate compound in a dispersed sol, to thereby allow the organic acid metallic chelate compound to effectively block a reaction by the introduction of residual oxygen (O, $O_2$), a reaction by a residual hydroxyl group (—OH), a reaction by a residual radical, and the like.

The present disclosure induces an effect of simply producing a compound suitable for a desired purpose in even an existing facility, by preparing an organic acid metallic chelate compound serving as a passivation film through a reflux method.

The present disclosure has an effect of solving a problem in that a substrate layer may be deformed due to the exposure to a temperature of 120° C. or higher when hot-air drying and ultraviolet irradiation are carried out for drying and curing of an applied coating film, by forming a substrate layer of polyethylene terephthalate having a high thermal deformation temperature and excellent dimensional stability.

The present disclosure has an effect of expressing sufficient optical characteristics by configuring the content of the non-radioactive stable isotope tungsten bronze compound in the dispersed sol to be 20-30 wt % and preventing the deformation of a dispersant by reducing the time of dispersion.

The present disclosure induces an effect of obtaining a sufficient dispersed sol and preventing the defects in the coating surface due to the existence of an un-dried dispersant on the coating surface when the coated surface is dried by configuring the content of the dispersant in the dispersed sol to be 1-10 wt %.

The present disclosure has an effect of greatly improving heat resistance and durability of the non-radioactive stable isotope tungsten bronze compound without greatly degrading optical characteristics, such as visible light transmittance and infrared light blocking rate, by configuring the content of the organic acid metallic chelate compound in the dispersed sol to be 5-10 wt %.

The present disclosure has an effect of facilitating the dispersion of the agglomerated powder, conveniently form a dispersed sol, and enable mass production, by forming the dispersed sol via a ball milling method.

The present disclosure has an effect of enhancing optical characteristics and coating adhesive strength of a film and improving surface scratch resistance by configuring the content of the dispersed sol in a coating sol to be 40-50 wt %.

The present disclosure has an effect of increasing the binding strength between a coating sol and a substrate layer and precisely adjusting the coating thickness by containing an oligomer, a monomer, and a photo-initiator, which correspond to a photopolymer and induce photo-polymerization by ultraviolet irradiation, in a coating sol.

The present disclosure has an effect of increasing surface scratch resistance while maintaining optical characteristics, preventing the occurrence of surface cracks, and enhancing adhesive strength with a substrate layer, by configuring the thickness of the coating film applied on the substrate layer to be 3-4 μm.

The present disclosure induces an effect of facilitating the attachment of a film to a building, a vehicle, or the like, by configuring an adhesive layer on one surface of a heat shielding layer.

The present disclosure has an effect of protecting one surface of an adhesive layer through a release paper by attaching the release paper to one surface of the adhesive layer.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, preferable embodiments of the environment-friendly heat shielding film using a non-radioactive stable isotope and the manufacturing method therefor according to the present disclosure will be described with reference to the accompanying drawings. In the following description, a detailed description of known functions and configurations incorporated herein will be omitted when it is determined that the detailed description may obscure the subject matter of the present disclosure. Unless particularly defined otherwise, all terms used in the present specification are the same as general meanings of the terms understood by those skilled in the art, and if the terms used in the present specification conflict with general meanings of the corresponding terms, the meanings of the terms comply with the meanings defined in the present specification.

Figure 1:
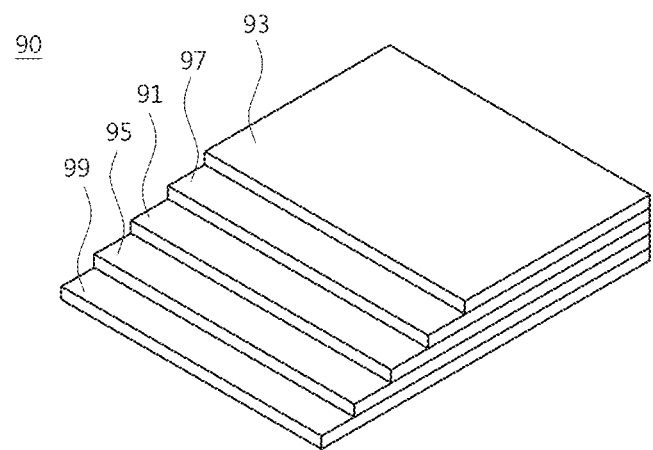
FIG. 1 shows a conventional heat shielding film.
Figure 2:
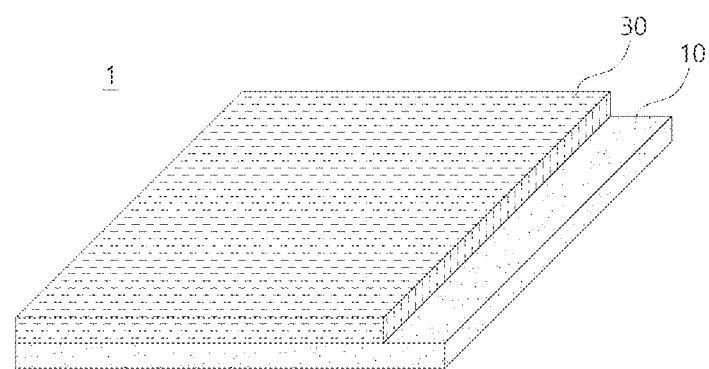
FIG. 2 shows an environment-friendly heat shielding film using a non-radioactive stable isotope according to an embodiment of the present disclosure.

FIG. 2 shows an environment-friendly heat shielding film using a non-radioactive stable isotope according to an embodiment of the present disclosure. Referring to FIG. 2, an environment-friendly heat shielding film 1 using a non-radioactive stable isotope, according to the present disclosure, includes a substrate layer 10 and a heat shielding layer 30.

The substrate layer 10 is configured to provide one surface on which the heat shielding layer 30 is coated, and supports a heat shielding layer 30 to be described later. As the substrate layer 10, polyethylene terephthalate, polycarbonate, nylon, polypropylene, or the like may be used. After the heat shielding layer 30 is applied on the substrate layer 10, hot-air drying and ultraviolet irradiation are typically conducted for drying and curing of an applied coating film. The substrate layer 10 may be exposed to a temperature of 120° C. or higher, and when a general plastic substrate is used alone, the substrate 10 may be deformed itself due to the inherent heat deformation temperature of the plastic substrate. Therefore, the substrate layer 10 is preferably formed of polyethylene terephthalate (PET) having a high thermal deformation temperature and excellent dimensional stability.

The heat shielding layer 30 is formed on one surface of the substrate layer 10 to prevent the input or output of solar heat outside and radiant heat inside. The heat shielding layer 30 contains a non-radioactive stable isotope tungsten bronze compound.

The term isotopes means elements that have the same atomic number but different mass numbers (the total number of protons and neutrons), and refers to elements that differ in the number of neutrons constituting a nucleus but have the same number of protons and thus have the same atomic number and the same chemical properties. The term radioactive isotope refers to an isotope that undergoes radioactive decay by emitting energy particles (radiation) in the procedure where an unstable nucleus in an isotope of a certain element is changed into a more stable state, and on the contrary, a non-radioactive isotope refers to an isotope that does not emit radiation since a nucleus in an isotope of a certain element is stable. The present disclosure provides an environment-friendly film that does not emit radiation and is harmless to the human body, by configuring a heat shielding layer 30 of a non-radioactive isotope.

The non-radioactive stable isotope tungsten bronze compound may form an oxygen-deficient $^{(Y)}A_x^{(182,183,184,186)}W_1O_{(3-n)}$ type hexagonal structure. The hexagonal close packed (HCP) or hexagonal system is one of the seven crystal systems depicted by three vectors in crystallography, and the hexagonal system has a shape like a prism having a regular hexagon as a bottom side. The hexagonal structure is called a dense hexagonal close-packed structure, and the characteristic of this structure is that atoms in one layer are located in the three atomic vacancies of the upper or lower layer thereof. As a result, one atom is in contact with three atoms in the upper layer, six atoms in the corresponding layer, and three atoms in the lower layer. The hexagonal structure has six atoms in one unit crystal, a coordination number of 12, and an atomic packing factor (APF) of 74%.

When inorganic heat shielding materials, such as antimony tin oxide (ATO), indium thin oxide (ITO), and tungsten bronze, have a primary particle size of 100 nm or less, the inorganic heat shielding materials often have an average particle size distribution of 100 nm or more when they are actually prepared into a dispersed sol. A dispersed sol having an average particle size distribution of 100 nm or more has haze, and a cloudy appearance exists due to scattering when a film is manufactured.

However, the $^{(Y)}A_x^{(182,183,184,186)}W_1O_{(3-n)}$ type hexagonal structure has a relatively small primary particle size, and thus there is no problem of particle size increase during a firing process in the preparation of compounds. Therefore, $^{(Y)}A_x^{(182,183,184,186)}W_1O_{(3-n)}$ the type hexagonal structure maximizes optical characteristics of existing inorganic heat shielding materials and solves a cloudy appearance problem. The actual particle size of the non-radioactive stable isotope tungsten bronze compound is 20-30 nm, and thus haze occurring in the 100 nm-grade particle sizes is fundamentally blocked.

In the $^{(Y)}A_x^{(182,183,184,186)}W_1O_{(3-n)}$ type hexagonal structure, the $^{(Y)}A$ is a non-radioactive alkali metal element or a non-radioactive alkali earth metal element, which has a stable isotope, and may include at least one of $^{(23)}Na$, $^{(39,41)}K$, $^{(85)}Rb$, $^{(133)}Cs$, $^{(24,25,26)}Mg$, and $^{(42,43,44)}Ca$. In the $^{(Y)}A_x^{(182,183,184,186)}W_1O_{(3-n)}$ type hexagonal structure, X represents the number of elements doped in $^{(Y)}A$ by reduction firing; Y represents the mass number of A; and (3-n) represents oxygen deficiency.

For example, cesium (Cs) among alkali metals is known to have a total of 40 isotopes between atomic weights of 112 to 151, and cesium present in nature is almost always $^{133}Cs$ with a mass number of 133. The $^{133}Cs$ is the only non-radioactive stable isotope that does not emit radiation. Therefore, the $^{133}Cs$ may be used when the heat shielding layer 30 is formed, wherein the $^{(Y)}A$ may be $^{133}Cs$.

In addition, tungsten (W) present in nature is a non-radioactive stable isotope that does not emit radiation, and $^{182}W$, $^{183}W$, $^{184}W$, and $^{186}W$ are present. These may be used when the heat shielding layer 30 is formed, wherein the $^{(182,183,184,186)}W$ may be $^{(182)}W$, $^{(183)}W$, $^{(184)}W$, and $^{(186)}W$.

The non-radioactive stable isotope tungsten bronze compound may be synthesized by a liquid precipitation method. According to the liquid precipitation method, a material of an opposite acid value (pH) to a reaction product obtained by easily dissolving a desired element precursor in a solvent is added in a predetermined amount to induce precipitation and sedimentation, and during this procedure, a desired inorganic compound can be synthesized by controlling the temperature, solvent, dropping material, reaction time, and the like. Herein, the reactor is not particularly limited, and the equipment for a heat source is also not limited, and thus existing equipment can be sufficiently utilized.

The non-radioactive stable isotope tungsten bronze hydrate synthesized by a liquid precipitation method is present in a state of having hydroxyl groups (—OH), and subjected to primary calcining to completely remove hydroxyl groups and water molecules.

The term calcining refers to an operation to remove some or all of volatile elements by heating a certain material at a high temperature, and the following reaction may be conducted.

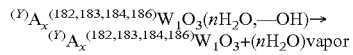
$$^{(Y)}A_x^{(182,183,184,186)}W_1O_3(nH_2O,—OH) \rightarrow {}^{(Y)}A_x^{(182,183,184,186)}W_1O_3 + (nH_2O)vapor$$

The temperature for primary calcining is preferably maintained in the range of 300-600° C. In cases where the calcining temperature is 300° C. or lower, the hydroxyl groups (—OH) and water molecules cannot be completely removed and thus the hydroxyl groups and water molecules may remain. The remaining hydroxyl groups and water molecules fail to form the above-described hexagonal structure. In cases where the calcining temperature is higher than 600° C., the growth of particles proceeds and thus nano-sized particles cannot be obtained, and as a result, haze may occur in a final product. Therefore, the temperature for primary calcining may be maintained in the range of preferably 400-600° C., and more preferably 400-500° C.

The crystal defects of the non-radioactive stable isotope tungsten bronze compound may be induced by secondary reduction firing.

The reduction firing is a firing method in which the air insufficiently supplied to combustion causes incomplete combustion and thus hydrogen in decomposition products of carbon dioxide or fuel causes a reduction action on an object of heating. The following reaction may be conducted.

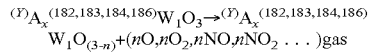
$$^{(Y)}A_x^{(182,183,184,186)}W_1O_3 \rightarrow {}^{(Y)}A_x^{(182,183,184,186)}W_1O_{(3-n)} + (nO, nO_2, nNO, nNO_2 \ldots )gas$$

In the secondary reduction firing, oxygen deficiency is preferably provided in a metal oxide by introducing an inert gas having no risk of explosion (including at least one of $N_2$, Ar, Ne, and $CO_3$) without using hydrogen gas having a risk of explosion to thereby reduce the metal oxide. The use of hydrogen gas requires expensive special equipment for gas injection, and when the injection conditions of hydrogen gas are not satisfied, merely a small amount of oxygen may cause a large explosion. Therefore, the inert gas is used to reduce the risk of work and conveniently use existing firing equipment. A powder formed by such secondary reduction firing may exhibit a dark blue color.

The non-radioactive stable isotope tungsten bronze compound has a non-radioactive stable isotope, and in order to form a harmless and environment-friendly compound, firing and calcining are carried out at temperatures lower than general firing and calcining temperatures, and as a result, the compound has a somewhat weak crystal structure with a defect of relatively oxygen deficiency and thus may have problems with respect to heat resistance, durability, and the like.

However, such problems with respect to heat resistance, durability, and the like may be solved by a passivation film.

The term passivation film refers to a metal oxide film in a state where ordinary chemical reactivity thereof is lost. Specifically, an organic acid metallic chelate compound having precedence in selective reactivity and no heterogeneous reactivity is formed on the surface of the non-radioactive stable isotope tungsten bronze compound or distributed in a dispersed sol, so that a reaction by the introduction of residual oxygen (O, $O_2$), a reaction by a residual hydroxyl group (—OH), a reaction by a residual radical, and the like are effectively blocked by the organic acid metallic chelate compound, thereby solving the problems with respect to heat resistance, durability, and the like of the non-radioactive stable isotope tungsten bronze compound.

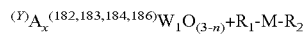
$$^{(Y)}A_x^{(182,183,184,186)}W_1O_{(3-n)} + R_1\text{-}M\text{-}R_2$$

As expressed in the above reaction, the organic acid metal chelate compound serving as a passivation film may have a structure of $R_1$-M-$R_2$, wherein $R_1$ and $R_2$ each may be any one of low-molecular weight type glutamic acid or high-molecular weight type sodium polyaspartate, which is a main body of an organic acid, and $R_1$ and $R_2$ may be the same or different. Preferably, M is any one element of Cu, Ag, Zn, Ni, W, and Co, which are transition metals.

The organic acid metal chelate compound may be prepared by a reflux method. Specifically, the organic acid chelate compound may be prepared by dissolving a precursor containing one element of Cu, Ag, Zn, Ni, W, and Co in an organic acid solvent, followed by agitation and reflux at a reaction temperature of 60-80° C. for a reaction time of 4-5 hours.

Figure 3:
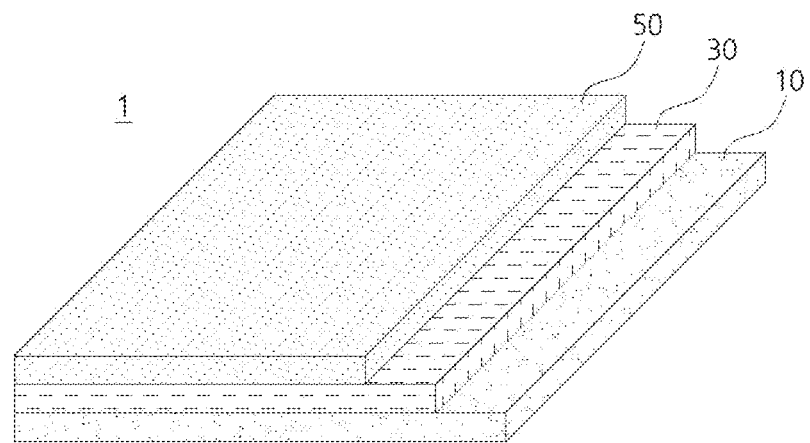
FIG. 3 shows an environment-friendly heat shielding film using a non-radioactive stable isotope according to another embodiment of the present disclosure.

FIG. 3 shows an environment-friendly heat shielding film using a non-radioactive stable isotope according to another embodiment of the present disclosure. The embodiment in FIG. 3 is different from the above-described embodiment in FIG. 2 only in that an adhesive layer 50 is added, and therefore, only the adhesive layer 50 will be described hereinafter.

The adhesive layer 50 is formed on one surface of the heat shielding layer 30. The adhesive layer 50 is configured to allow the heat shielding film 1 including the heat shielding layer 30 to be easily attached to a building or a vehicle. The adhesiveness of the adhesive layer 50 mainly depends on the molecular weight, the molecular weight distribution, or the molecular structure of a polymer chain, and especially, the adhesiveness is determined by the molecular weight, and therefore, an acrylic copolymer is preferably 800,000-200,000 in weight average molecular weight. Meanwhile, a methacrylate monomer having an alkyl group with 1-12 carbon atoms is preferably contained in 90-99.9 wt % in the acrylic copolymer. The reason is that the initial adhesive strength may be degraded when the methacrylate monomer is contained in 90 wt % or less in the acrylic copolymer, and a problem in durability may be caused due to the degradation of agglomerating force when the methacrylate monomer is contained in 99.9 wt % or more.

Figure 4:
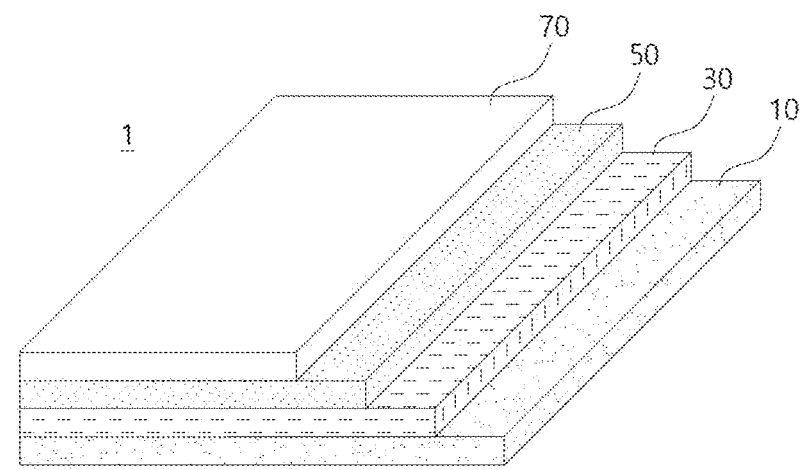
FIG. 4 shows an environment-friendly heat shielding film using a non-radioactive stable isotope according to still another embodiment of the present disclosure.

FIG. 4 shows an environment-friendly heat shielding film using a non-radioactive stable isotope according to still another embodiment of the present disclosure. The embodiment in FIG. 4 is different from the above-described embodiment in FIG. 3 only in that a release paper 70 is added, and therefore, only the release paper 70 will be described hereinafter.

The release paper 70 is formed on one surface of the adhesive layer 50, and protects an external surface of the adhesive layer 50. As the release paper 70, a film in which a PET substrate is treated with silicone coating is preferably used. If the PET substrate is not treated with silicone coating, the release paper 70 may not be separated from the adhesive layer 50 when a finally manufactured heat shielding film is applied to glass.

Figure 5:
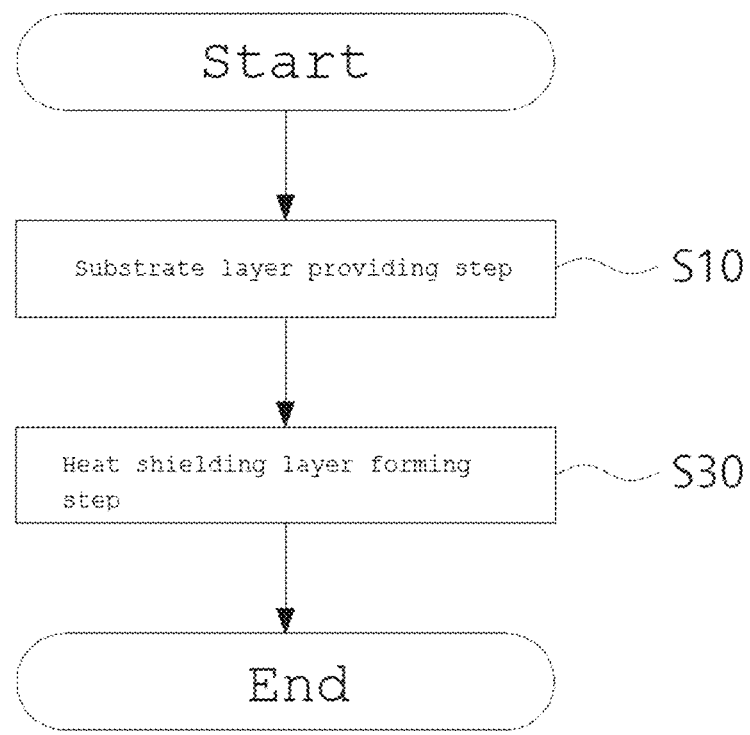
FIG. 5 shows a method for manufacturing an environment-friendly heat shielding film using a non-radioactive stable isotope according to an embodiment of the present disclosure.

FIG. 5 shows a method for manufacturing an environment-friendly heat shielding film using a non-radioactive stable isotope according to an embodiment of the present disclosure. Hereinafter, the method for manufacturing an environment-friendly heat shielding film using a non-radioactive stable isotope, S1, will be described with reference to FIG. 5. To avoid overlapping descriptions, the description of the above-described environment-friendly heat shielding film 1 using the non-radioactive stable isotope will be omitted or simplified.

Referring to FIG. 5, the method for manufacturing an environment-friendly heat shielding film using a non-radioactive stable isotope, S1, includes a substrate layer providing step S10 and a heat shielding layer forming step S30.

The substrate layer providing step S10 is a step of providing the substrate layer 10 to be combined with the heat shielding layer 30. Therefore, the substrate layer 10 may be formed of polyethylene terephthalate (PET) having a high thermal deformation temperature and excellent dimensional stability.

Figure 6:
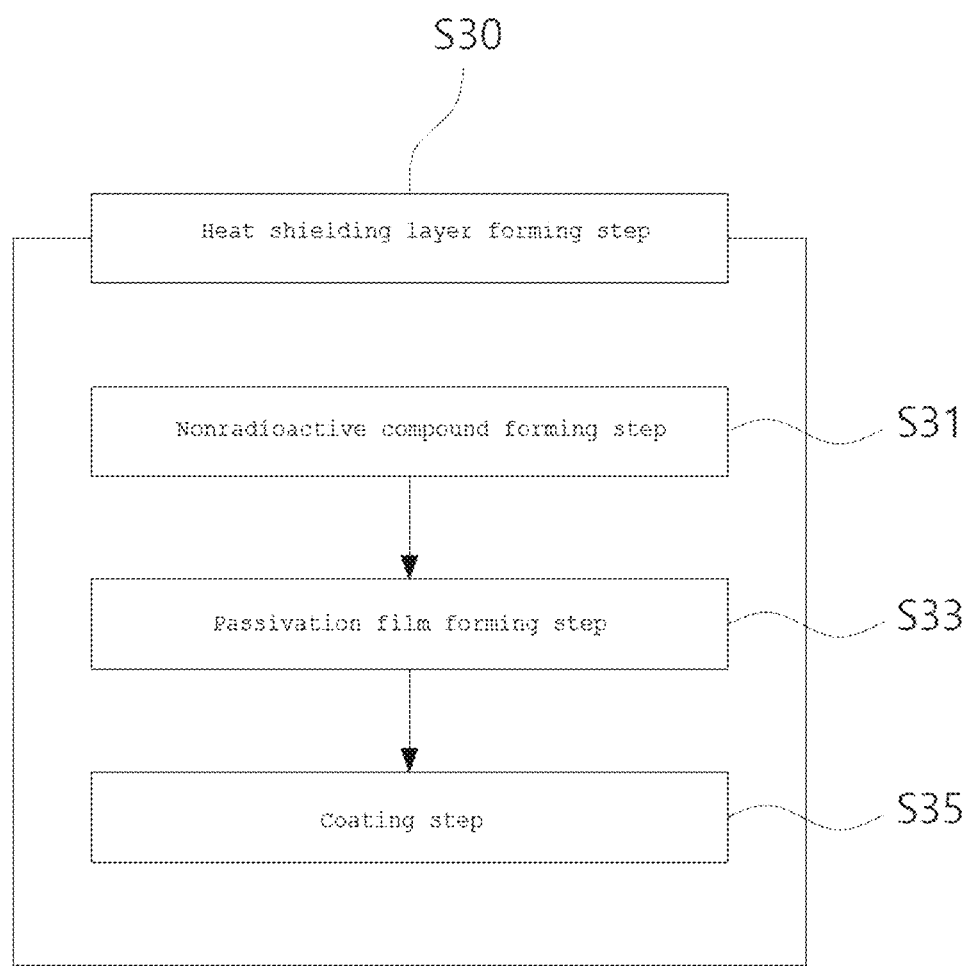
FIG. 6 shows the heat shielding layer forming step in FIG. 5.

The heat shielding layer forming step S30 is a step of, after the substrate layer providing step S10, forming the heat shielding layer 30 on one surface of the substrate layer 10. The heat shielding layer 30 contains a non-radioactive stable isotope tungsten bronze compound, and the non-radioactive stable isotope tungsten bronze compound may form an oxygen-deficient $^{(Y)}A_x^{(182,183,184,186)}W_1O_{(3-n)}$ type hexagonal structure. In the $^{(Y)}A_x^{(182,183,184,186)}W_1O_{(3-n)}$ type hexagonal structure, the $^{(Y)}A$ is a non-radioactive alkali metal element and/or a non-radioactive alkali earth metal element, which has a stable isotope, and may include at least one of $^{(23)}Na$, $^{(38,41)}K$, $^{(85)}Rb$, $^{(133)}Cs$, $^{(24,25,26)}Mg$, and $^{(42,43,44)}Ca$. FIG. 6 shows the heat shielding layer forming step in FIG. 5. Referring to FIG. 6, the heat shielding layer forming step S30 includes a non-radioactive compound forming step S31, a passivation film forming step S33, and a coating step S35.

Figure 7:
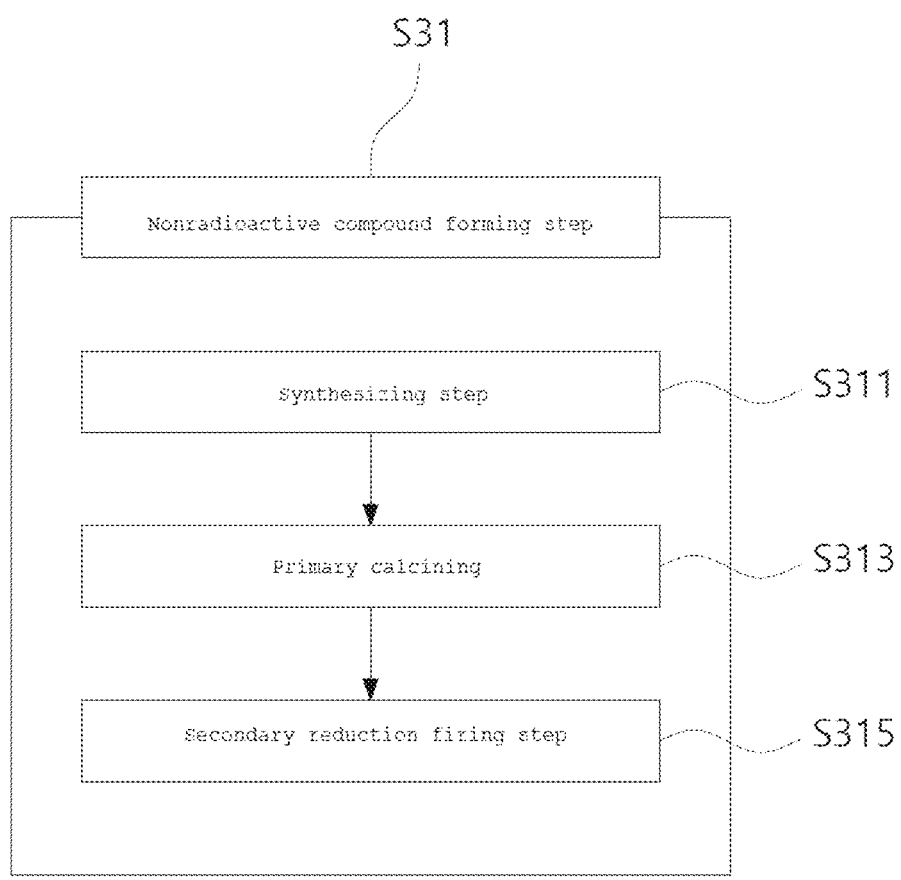
FIG. 7 shows the non-radioactive compound forming step in FIG. 6.

The non-radioactive compound forming step S31 is a step of preparing a hexagonal type non-radioactive stable isotope tungsten bronze compound. FIG. 7 shows the non-radioactive compound forming step in FIG. 6. Referring to FIG. 7, the non-radioactive compound forming step S31 includes a synthesizing step S311, a primary calcining step S313, and a secondary reduction firing step S315.

The synthesizing step S311 is a step of synthesizing a non-radioactive stable isotope tungsten bronze hydrate, and the step may be preferably performed by a liquid precipitation method. The non-radioactive stable isotope tungsten bronze hydrate is prepared by a simple liquid precipitation method with simple synthesis conditions, so that the particle generation and the particle size are easily controlled, thereby obtaining uniform nano-sized particles.

As a specific example for the synthesis of a non-radioactive stable isotope tungsten bronze hydrate, 30 wt % of a white powder of sodium tungstate dihydrate ($Na_2WO_4.2H_2O$), as a non-radioactive stable isotope tungsten bronze hydrate, among tungsten chloride ($WCl_2$), tungstic acid ($H_2WO_4$), sodium tungstate dihydrate ($Na_2WO_4.2H_2O$), tungsten hexa (2-propanolate) ($C_{18}H_{42}O_6W$), tungsten selenide ($H_2Se_2W$), tungsten telluride ($WTe_2$), and tungsten boride ($BH_2W$), which are formed of only tungsten ($W_1$) stable isotopes ($^{182}W$, $^{183}W$, $^{184}W$, and $^{186}W$), and 15 wt % of potassium carbonate ($KCO_3$) among potassium hydroxide (KOH), potassium chloride (KCl), and potassium carbonate ($KCO_3$) composed of only potassium stable isotopes ($^{39}K$ (93.3%) and $^{41}K$ (6.7%)) in the positive elements ($^{(Y)}Na$, $^{(Y)}K$, $^{(Y)}Rb$, $^{(Y)}Cs$, $^{(Y)}Mg$, and $^{(Y)}Ca$) corresponding to $^{(Y)}A_x$ are placed together with distilled water into a 4-neck flask reactor, and then the mixture is completely dissociated into a colorless and transparent liquid by slow agitation for 3 hours while the temperature is maintained at 80° C. by using a heating mantle. In addition, 50 wt % of the organic acid fumaric acid as a dropping material is dissociated in distilled water, and then dropped into the flask reactor, which contains the previous precursor dissolved therein, by using a dropping funnel, at a constant rate for 20 minutes, so that the colorless and transparent solution is gradually formed into a yellow viscous liquid. After aging for a certain period of time, the reaction is terminated, and filters and byproducts are washed, thereby obtaining 45 wt % of a light-gray reaction product.

The primary calcining step S313 is a step of, after the synthesizing step S311, carrying out calcining in the range of 300-600° C. to remove hydroxyl groups (—OH) and water molecules from the synthesized non-radioactive sable isotope tungsten bronze hydrate and form an amorphous form. The primary calcining step may be expressed by the following reaction.

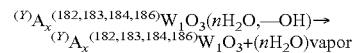

The non-radioactive stable isotope tungsten bronze hydrate synthesized by a liquid precipitation method is present in a state of having hydroxyl groups (—OH), and subjected to primary calcining to completely remove the hydroxyl groups and water molecules. The temperature for the primary calcining is preferably maintained in the range of 300-600° C. When the calcination temperature is 300° C. or lower, the hydroxyl groups (—OH) and water molecules cannot be completely removed and thus the hydroxyl groups and water molecules may remain. The remaining hydroxyl groups and water molecules cannot form the above-described hexagonal structure. When the calcining temperature is higher than 600° C., the growth of particles progresses and thus nano-sized particles cannot be obtained, and as a result, haze may occur in final products. Therefore, the temperature for the primary calcining may be maintained in the range of preferably 400-600° C. and more preferably 400-500° C. Through the primary calcining step S313, the hydroxyl groups and water molecules are completely removed from the non-radioactive stable isotope tungsten bronze hydrate and the growth of particles is minimized, so that nano-sized particles can be obtained.

The secondary reduction firing step S315 is a step of, after the primary calcining step S313, carrying out reduction firing under the introduction of an inert gas for oxygen deficiency of the non-radioactive stable isotope tungsten bronze compound. The secondary reduction firing step may be expressed by the following reaction.

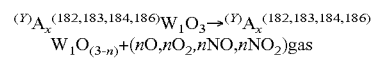

The inert gas used in the secondary reduction firing step S315 includes one or more of $N_2$, Ar, Ne, and $CO_3$. The crystal defects in the non-radioactive stable isotope tungsten bronze compound may be induced by the secondary reduction firing step S315. The reduction firing is a firing method in which the air insufficiently supplied to combustion causes incomplete combustion and thus hydrogen in decomposition products of carbon dioxide or fuel causes a reduction action on an object of heating. In the secondary reduction firing S315, oxygen deficiency is provided in a metal oxide by introducing an inert gas having no risk of explosion (including at least one of $N_2$, Ar, Ne, and $CO_3$) without using hydrogen gas having a risk of explosion to reduce the metal oxide. The use of hydrogen gas requires expensive special equipment for gas injection, and when the injection conditions of hydrogen gas are not satisfied, merely a small amount of oxygen may cause a large explosion. Therefore, the inert gas is used to reduce the working risk and enables the use of existing firing equipment. A powder formed by such secondary reduction firing may exhibit a dark blue color.

The passivation film forming step S33 is a step of, after the non-radioactive compound forming step S31, forming a passivation film on the non-radioactive stable isotope tungsten bronze compound in order to improve heat resistance and durability. The non-radioactive stable isotope tungsten bronze compound contains a non-radioactive stable isotope, and in order to form a harmless and environment-friendly compound, firing and calcining are carried out at temperatures lower than general firing and calcining temperatures, and as a result, the compound has a somewhat weak crystal structure with relatively oxygen-deficient defects and thus may have problems in heat resistance, durability, and the like. Therefore, such problems with respect to heat resistance, durability, and the like are solved through the passivation film forming step S33. The term passivation film refers to a metal oxide film in a state where ordinary chemical reactivity is lost. Specifically, an organic acid metallic chelate compound having precedence in selective reactivity and no heterogeneous reactivity is formed on the surface of the non-radioactive stable isotope tungsten bronze compound or distributed in a dispersed sol, so that a reaction by the introduction of residual oxygen (O, $O_2$), a reaction by a residual hydroxyl group (—OH), a reaction by a residual radical, and the like are effectively blocked by the organic acid metallic chelate compound, thereby solving the problems with respect to heat resistance, durability, and the like of the non-radioactive stable isotope tungsten bronze compound.

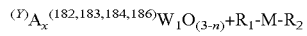

$$^{(Y)}A_x^{(182,183,184,186)}W_1O_{(3-n)} + R_1\text{-}M\text{-}R_2$$

Figure 8:
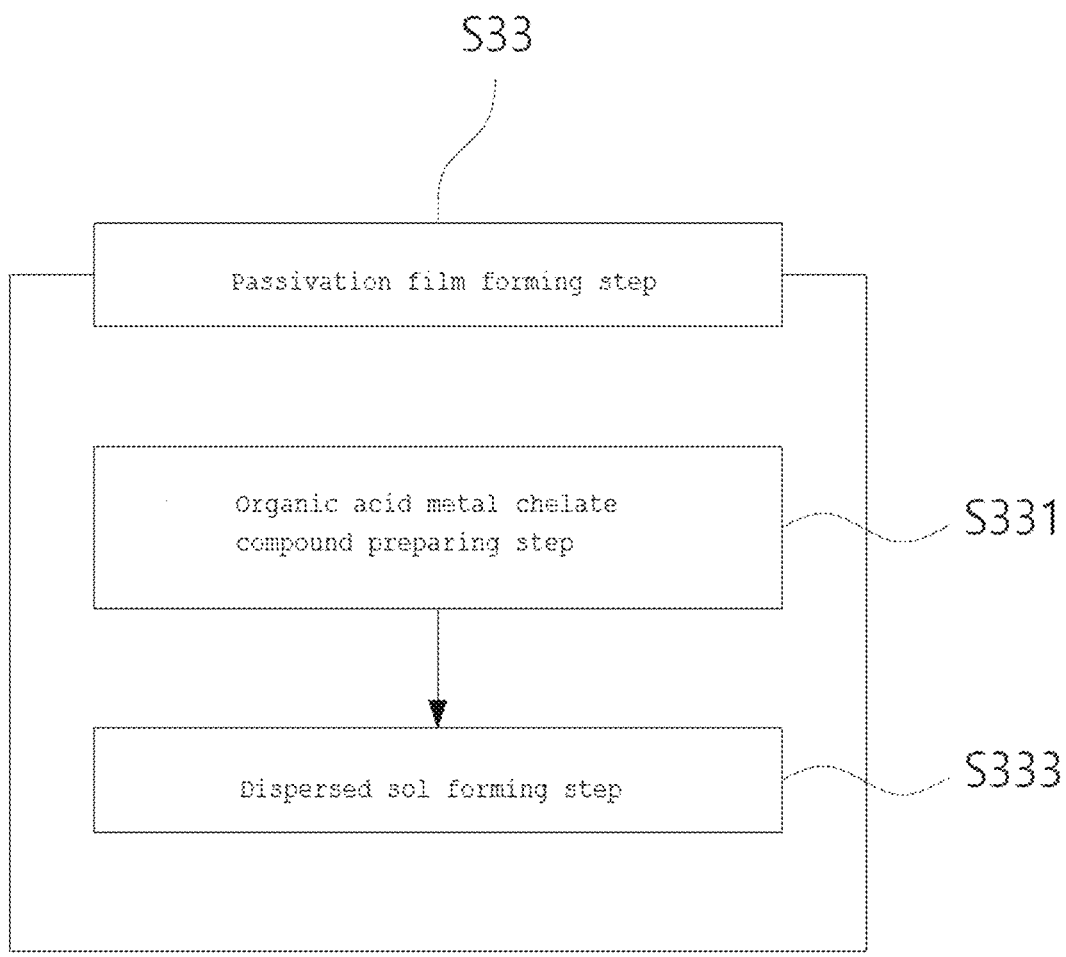
FIG. 8 shows the passivation film forming step in FIG. 6.

As expressed by the above reaction, the organic acid metal chelate compound serving as a passivation film may have a structure of $R_1$-M-$R_2$. $R_1$ and $R_2$ each may be any one of low-molecular weight type glutamic acid or high-molecular weight type sodium polyaspartate, which is a main body of an organic acid, and $R_1$ and $R_2$ may be the same as or different from each other. Preferably, M is any one element of Cu, Ag, Zn, Ni, W, and Co, which are transition metals. The organic acid metal chelate compound may be prepared by a reflux method. Specifically, the organic acid chelate compound may be prepared by dissolving a precursor containing one element of Cu, Ag, Zn, Ni, W, and Co in an organic acid solvent, followed by agitation and reflux at a reaction temperature of 60-80° C. for a reaction time of 4-5 hours. An organic acid metallic chelate compound serving as a passivation film is prepared through a reflux method, so that a compound suitable for a desired purpose can be simply prepared in even an existing facility. FIG. 8 shows the passivation film forming step in FIG. 6. Referring to FIG. 8, the passivation film forming step S33 includes an organic acid metal chelate compound preparing step S331 and a dispersed sol forming step S333.

The organic acid metal chelate compound preparing step S331 is a step of preparing an organic acid metal chelate compound, and the organic acid metal chelate compound may be prepared by a reflux method. Specifically, a precursor containing one element selected from the group consisting of transition metals is dissolved in a solvent, followed by agitation and reflux at a reaction temperature of 60-80° C. for a reaction time of 4-5 hours. According to the reflux method, the organic acid metal chelate compound serving as a passivation film can be simply prepared in even an existing facility.

The dispersed sol forming step S333 is a step of, after the organic acid metal chelate compound preparing step S331, forming a dispersed sol. The dispersed sol may contain a non-radioactive stable isotope tungsten bronze compound, a dispersant, an organic acid metal chelate compound, and a solvent (organic solvent).

The content of the non-radioactive stable isotope tungsten bronze compound in the dispersed sol is preferably 20-30 wt %. When the content of the non-radioactive stable isotope tungsten bronze compound is less than 20 wt %, sufficient optical characteristics cannot be expressed with a low thickness in the formation of a final coating film, and when the content of the non-radioactive stable isotope tungsten bronze compound is more than 30 wt %, a relatively large time of dispersion is required to reach a desired particle size of a nano-dispersed sol due to a high content of solids. The prolonged dispersion time may cause the deformation of the dispersant, which may cause problems in the next step, coating sol production. A polymer binder is included in order to prepare a coating sol to be described later, and the mixing of a dispersed sol prepared through the excessive time of dispersion and the polymer binder degrades compatibility therebetween, resulting in problems of layer separation, micro-shocking, gelation over time, and the like.

The content of the dispersant in the dispersed sol is preferably 1-10 wt %. When the dispersant is less than 1 wt %, a dispersed sol cannot be sufficiently obtained, and when the dispersant is more than 10 wt %, defects in the coating surface may be caused due to the existence of a non-dried dispersant on the coating surface when the coated surface is dried.

The content of the organic acid metal chelate compound in the dispersed sol is preferably 5-10 wt %. When the content of the organic acid metal chelate compound is less than 5 wt %, a passivation film phenomenon is not favorably expressed, and thus cannot largely improve heat resistance and durability of the non-radioactive stable isotope tungsten bronze compound. When the content of the organic acid metal chelate compound is more than 10 wt %, the visible light transmittance in the optical characteristics of the non-radioactive stable isotope tungsten bronze compound may be degraded, thereby making it difficult to manufacture a high-transmittance high-efficiency heat shielding film.

The film needs to transmit visible light therethrough, but the non-radioactive stable isotope tungsten bronze compound has an agglomerated form, and thus the particles thereof are preferably dispersed. To this end, in the dispersed sol forming step S333, a dispersed sol may be formed while the particles are dispersed by a ball mill method that is simple and easy for mass production.

Specifically, the non-radioactive stable isotope tungsten bronze compound powder in the agglomerated form, a solvent (organic solvent), a dispersant, and the like are placed in a cylindrical dispersion device, and zirconium beads are placed in an amount of more than 60% of the volume of the cylindrical dispersion device, and then the cylindrical dispersion device is rotated at a constant rate. Here, all the contents inside the cylindrical dispersion device are rotated, and especially, the zirconium beads directly transfer a surface impact and surface shear force to the agglomerated powder to be dispersed to thereby apply physical energy thereto and induce surface grinding, and thus after a predetermined time, nanoparticles having a smaller size than the primary particle size are dispersed and finally, optical characteristics can be expressed.

Ultimately, in the dispersed sol forming step S333, an organic acid metal chelate compound that separates the agglomeration of compounds and improves heat resistance and durability of the non-radioactive stable isotope tungsten bronze compound is distributed together in a liquid state, or formed on the surface.

Figure 9:
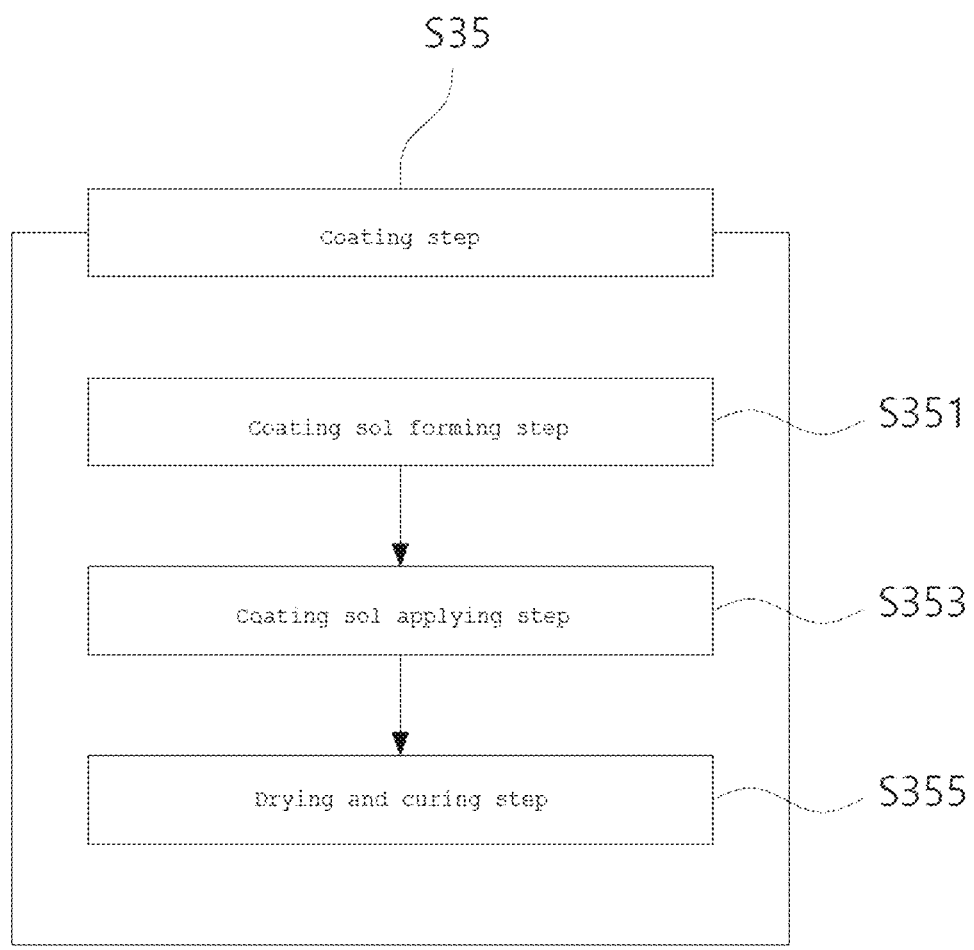
FIG. 9 shows the coating step in FIG. 6.

The coating step S35 is a step of, after the passivation film forming step S33, forming a coating film on the substrate layer 10. FIG. 9 shows the coating step in FIG. 6. Referring to FIG. 9, the coating step S35 includes a coating sol forming step S351, a coating sol coating step S353, and a drying and curing step S355.

The coating sol forming step S351 is a step of forming a coating sol, and the coating sol may include a dispersed sol, a binder, and an organic solvent.

The content of the dispersed sol is preferably 40-50 wt % in the coating sol. Less than 40 wt % of the dispersed sol may degrade optical characteristics of a film, and more than 50 wt % of the dispersed sol may reduce the proportion of a binder, thereby decreasing adhesive strength of the coating film or degrading surface scratch resistance. More preferably, the coating sol may be configured of 40-50 wt % of the dispersed sol, 40-50 wt % of the binder, 10-20 wt % of the organic solvent.

In the coating sol, the binder facilitates the binding of the coating sol to a plastic film as a substrate and controls the thickness of the coating film. The binder is a photopolymer and may be configured of an oligomer, a monomer, and a photo-initiator, which induce photo-polymerization by ultraviolet irradiation.

In the coating sol, the organic solvent may include at least any one of methyl ethyl ketone, toluene, ethyl acetate, iso-propyl alcohol, ethyl cellosolve, iso-butyl alcohol, dimethylformamide, ethanol, butyl cellosolve, xylene, 1-octanol, and diethylene glycol, nitrobenzene.

The coating sol coating step S353 is a step of, after the coating sol forming step S351, applying the coating sol on the substrate layer 10. Preferably, the coating sol applying step S353 may be performed by using any one of micro-gravure coating, knife coating, and roll-to-roll coating, and more preferably, as for large-area coating, micro-gravure coating that exhibits the flattest coating surface and is relatively productive may be used.

The thickness of the applied coating film is preferably 3-4 µm. Less than 3 µm in the coating thickness fails to express optical characteristics and degrades surface scratch resistance, and more than 4 µm in the coating thickness results in the formation of a hard ultraviolet coating layer, with the result that cracks may occur in the surface of the coating film or the adhesive strength of the coating film with the substrate layer 10 may be degraded.

The drying and curing step S355 is a step of, after the coating sol applying step S353, subjecting the substrate layer 10, on which the coating sol is applied, to hot-air drying and ultraviolet curing.

Figure 10:
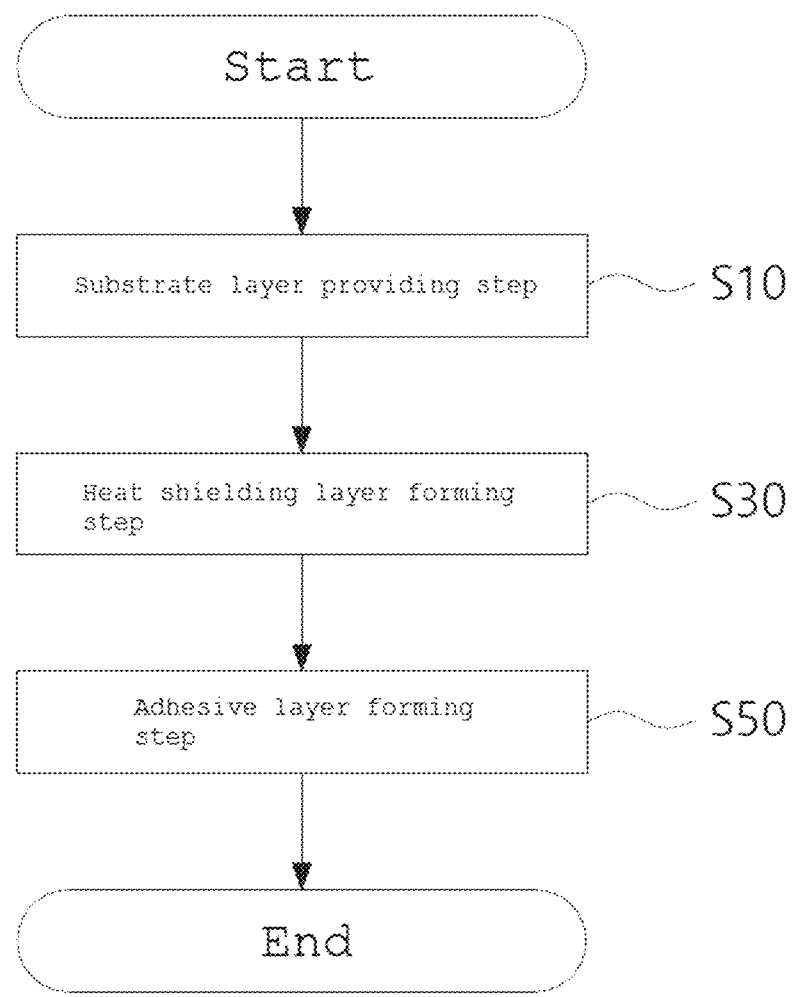
FIG. 10 shows a method for manufacturing an environment-friendly heat shielding film using a non-radioactive stable isotope according to another embodiment of the present disclosure.

FIG. 10 shows a method for manufacturing an environment-friendly heat shielding film using a non-radioactive stable isotope according to another embodiment of the present disclosure. The example in FIG. 10 has a feature in which the adhesive layer forming step S50 is added after the heat shielding layer forming step S30 in the above-described embodiment in FIG. 5, and thus hereinafter, the adhesive layer forming step S50 will be described.

The adhesive layer forming step S50 is a step of, after the heat shielding layer forming step S30, forming an adhesive layer 50 on one surface of the heat shielding layer 30. The adhesiveness of the adhesive layer 50 mainly depends on the molecular weight, molecular weight distribution, or molecular structure of a polymer chain, and especially, the adhesiveness is determined by the molecular weight, and therefore, an acrylic copolymer is preferably 800,000-200,000 in weight average molecular weight. Meanwhile, a methacrylate monomer having an alkyl group with 1-12 carbon atoms is preferably contained in 90-99.9 wt % in the acrylic copolymer. The reason is that the initial adhesive strength may be degraded when the methacrylate monomer is contained in wt % or less in the acrylic copolymer, and the degradation of agglomerating force may cause a problem in durability when the methacrylate monomer is contained in 99.9 wt % or more. The heat shielding film 1 can be easily attached to a building or a vehicle by the adhesive layer 50.

Figure 11:
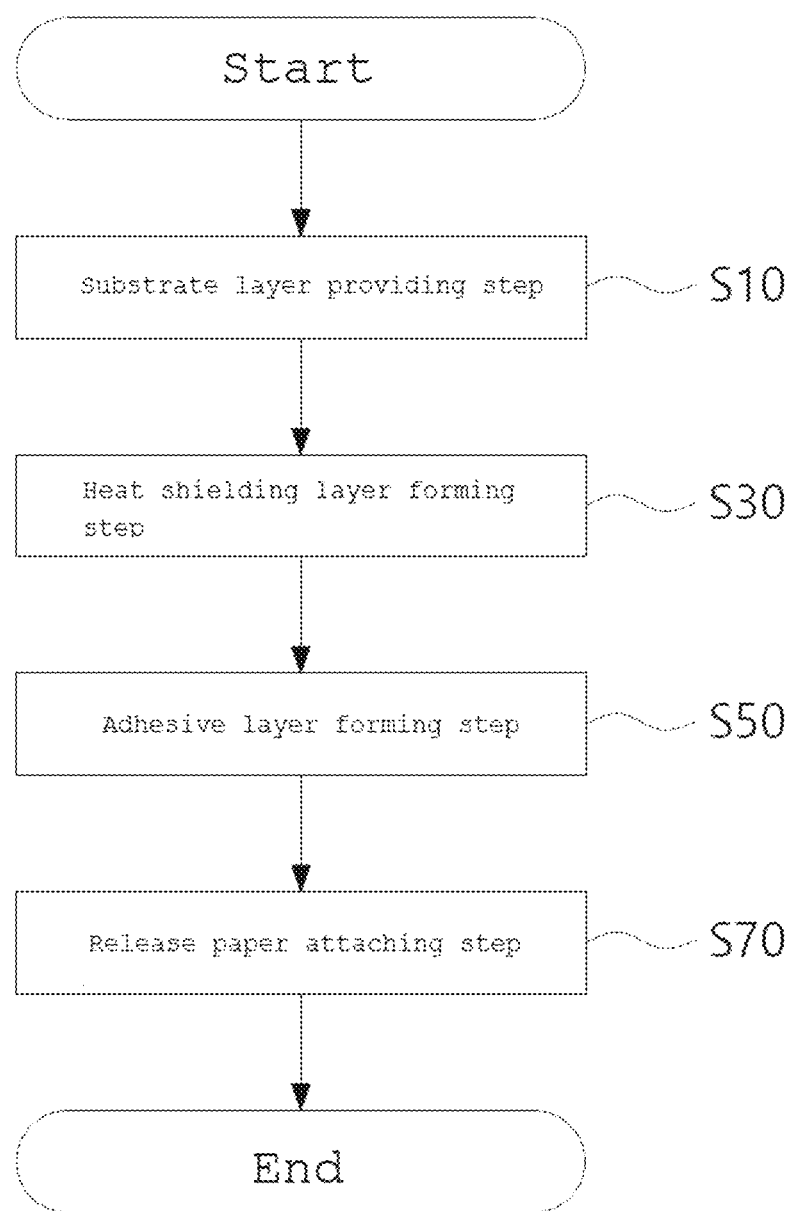
FIG. 11 shows a method for manufacturing an environment-friendly heat shielding film using a non-radioactive stable isotope according to still another embodiment of the present disclosure.

FIG. 11 shows a method for manufacturing an environment-friendly heat shielding film using a non-radioactive stable isotope according to still another embodiment of the present disclosure. The embodiment in FIG. 11 has a feature in which a release paper attaching step S70 is added after the adhesive layer forming step S30 in the above-described embodiment in FIG. 10.

The release paper attaching step S70 is a step of, after the adhesive layer forming step S50, attaching a release paper 70 on one surface of the adhesive layer 50. The release paper 70 is formed on one surface of the adhesive layer 50, and protects an external surface of the adhesive layer 50. As the release paper 70, a film in which a PET substrate is treated with silicone coating is preferably used. If the PET substrate is not treated with silicone coating, the release paper 70 may not be separated from the adhesive layer 50 when a finally manufactured heat shielding film is applied to glass. Through the release paper attaching step S70, one surface of the adhesive layer 50 can be protected by the release paper 70.

Hereinafter, the facts that the configuration of a heat shielding film of a non-radioactive stable isotope tungsten bronze compound improves stability against radiation, visible light transmittance, and infrared light blocking rate and the heat resistance and durability of the non-radioactive stable isotope tungsten bronze compound are improved by a passivation film will be described with reference to specific examples.

(1) Sample Preparation

1) Example 1

Preparation of Non-Radioactive Stable Isotope Tungsten Bronze Compound

First, 30 wt % of a white powder of sodium tungstate dihydrate ($Na_2WO_4.2H_2O$) and 15 wt % of potassium carbonate ($KCO_3$) were placed together with distilled water into a 4-neck flask reactor, and then the mixture was completely dissociated into a colorless and transparent liquid by slow agitation for 3 hours while the temperature was maintained at 80° C. by using a heating mantle. In addition, 50 wt % of the organic acid fumaric acid as a dropping material was dissociated in distilled water, and then dropped into the flask reactor, which contained the previous precursor dissolved therein, by using a dropping funnel, at a constant rate for 20 minutes, so that the colorless and transparent solution was gradually formed into a yellow viscous liquid. After aging for a certain period of time, the reaction is terminated, and filters and byproducts are washed, thereby obtaining 45 wt % of a light-gray reaction product. As described above, a hydrate state of potassium tungsten oxide is obtained, and then subjected to firing at a temperature of 400° C. for about 1 hour for primary calcining. Thereafter, in order to form lattice defects and hexagonal crystals in the non-radioactive stable isotope potassium tungsten oxide, an electric furnace was filled with nitrogen ($N_2$) and the temperature was maintained at 600° C. for 2 hours, and then secondary reduction firing was ended by natural cooling, thereby obtaining a blue non-radioactive stable isotope potassium tungsten oxide ($^{(39,41)}K_x{}^{(182,183,184,186)}WO_{(3-n)}$).

Preparation of Organic Acid Metal Chelate Compound

As a precursor of an organic acid metal chelate compound, 30 wt % of ammonium chloride zinc and ethanol were placed into a reflux reactor, followed by agitation, thereby forming a colorless and transparent liquid phase. Here, 40 wt % of low-molecular weight glutamic acid was introduced, followed by reaction for 4 hours while the reaction temperature was maintained at 60° C., thereby forming a light-gray viscous liquid. After the end of the reaction, a filter, byproducts, and the like were washed and dried, thereby obtaining an organic acid metal chelate compound as a light-gray powder.

Preparation of Dispersed Sol

In order to prepare the powders thus obtained into a dispersed sol form, 20 wt % of a reduction-fired non-radioactive stable isotope potassium tungsten oxide ($^{(39,41)}K_x{}^{(182,183,184,186)}WO_{(3-n)}$) powder, 5 wt % of an organic acid zinc chelate, 0.5 wt % of a dispersant, and 74.5 wt % of an organic solvent were introduced, and 0.5-mm zirconium beads were placed in an amount of more than 60% of the total volume, followed by ball milling. The time of dispersion was 72 hours.

Preparation of Coating Sol

After 40 wt % of a dispersed sol was added to 50 wt % of a photopolymer binder, 10 wt % of methyl ethyl ketone (MEK) as an organic solvent was introduced to complete a coating sol.

Formation of Coating Film

The completed coating sol was coated on a PET film as a substrate layer so that the coating thickness was 3-4 μm.

Formation of Adhesive Layer and Attachment of Release Paper

An adhesive layer was formed with a thickness of 6-7 μm on the back surface on which the heat shielding layer was coated, and bound to the release paper, thereby completing a final heat shielding film.

Preparation of Heat Shielding Film

Example 1 was prepared by cutting the heat shielding film into 145 mm width×145 nm length.

2) Example 2

Example 2 was prepared in the same conditions as in Example 1 except that in the synthesis procedure of a non-radioactive stable isotope tungsten bronze compound powder, 15 wt % of sodium carbonate ($Na_2CO_3$) composed of only a sodium stable isotope ($^{23}Na$) was introduced instead of potassium carbonate ($KCO_3$) as a starting raw material.

That is, a non-radioactive stable isotope sodium tungsten oxide ($^{(23)}Na_x{}^{(182,183,184,186)}WO_{(3-n)}$) was formed by replacing existing potassium with sodium as a positive element in the composition of the non-radioactive stable isotope potassium tungsten oxide ($^{(39,41)}K_x{}^{(182,183,184,186)}WO_{(3-n)}$).

3) Example 3

Example 3 was prepared in the same conditions as in Example 1 except that in the synthesis procedure of a non-radioactive stable isotope tungsten bronze compound powder, 15 wt % of cesium carbonate ($Cs_2CO_3$) composed of only a cesium stable isotope ($^{133}Cs$) was introduced instead of potassium carbonate ($KCO_3$) as a starting raw material.

That is, a non-radioactive stable isotope cesium tungsten oxide ($^{(133)}Cs_x{}^{(182,183,184,186)}WO_{(3-n)}$) was formed by replacing existing potassium with cesium as a positive element in the composition of the non-radioactive stable isotope potassium tungsten oxide ($^{(39,41)}K_x{}^{(182,183,184,186)}WO_{(3-n)}$).

4) Example 4

Example 4 was prepared in the same conditions as in Example 1 except that in the synthesis procedure of the non-radioactive stable isotope potassium tungsten oxide ($^{(39,41)}K_x{}^{(182,183,184,186)}WO_{(3-n)}$) powder, argon gas was added instead of nitrogen in the reduction firing step, and in the synthesis procedure of the organic metal chelate powder, 30 wt % of copper chloride dihydrate was added instead of 30 wt % of ammonium zinc chloride.

That is, in the reduction firing step of the non-radioactive stable isotope potassium tungsten oxide ($^{(39,41)}K_x{}^{(182,183,184,186)}WO_{(3-n)}$), existing nitrogen gas was replaced with argon gas, and in the organic acid metal chelate, existing zinc was replaced with copper.

5) Example 5

Example 5 was prepared in the same conditions as in Example 1 except that in the preparation procedure of the non-radioactive stable isotope potassium tungsten oxide ($^{(39,41)}K_x{}^{(182,183,184,186)}WO_{(3-n)}$) dispersed sol, 20 wt % of a reduction-fired powder, 9 wt % of an organic acid zinc chelate, 1.0 wt % of a dispersant, and 70 wt % of an organic solvent were formed into 30 wt % of solids of the final dispersed sol.

That is, the solid content was increased such that the organic acid zinc chelate was changed into 10 wt % from existing 5 wt %.

6) Example 6

Example 6 was prepared in the same conditions as in Example 1 except that in the preparation procedure of the non-radioactive stable isotope potassium tungsten oxide ($^{(39,41)}K_x{}^{(182,183,184,186)}WO_{(3-n)}$) dispersed sol, 29 wt % of a reduction-fired powder, 1.0 wt % of a dispersant, and 70 wt % of an organic solvent were formed into 30 wt % of solids of the final dispersed sol.

That is, the organic acid zinc chelate contained in the dispersed sol was excluded in Example 1.

7) Comparative Example 1

Comparative Example 1 was prepared in the same conditions as in Example 1 except that a potassium tungsten oxide ($^{(40)}K_x{}^{(182,183,184,186)}WO_{(3-n)}$) powder was synthesized by replacing the non-radioactive stable isotope $^{(39,41)}K$ with the radioactive isotope $^{(40)}K$.

That is, in the composition of the non-radioactive stable isotope potassium tungsten oxide ($^{(39,41)}K_x{}^{(182,183,184,186)}WO_{(3-n)}$), existing non-radioactive stable isotope $^{(39,41)}K$ among alkali metal elements was replaced with the radioactive isotope $^{(40)}K$.

8) Comparative Example 2

Comparative Example 2 was prepared in the same conditions as in Example 2 except that the non-radioactive stable isotope $^{(23)}$Na was replaced with the radioactive isotope $^{(24)}$Na, and in the primary firing, the radioactive sodium tungsten oxide ($^{(24)}$Na$_x^{(182,183,184,186)}$WO$_{(3-n)}$) powder was synthesized by applying high power (2,450 MHz) in a microwave furnace instead of a conventional electric furnace.

That is, in the composition of the non-radioactive stable isotope potassium tungsten oxide ($^{(23)}$K$_x^{(182,183,184,186)}$WO$_{(3-n)}$), existing non-radioactive stable isotope $^{(23)}$Na among alkali metal elements was replaced with the radioactive isotope $^{(24)}$Na and the primary calcining was conducted in a microwave dielectric heating manner instead of an existing heating manner.

(2) Test 1—Observation of Particle Size

Test Purpose

Measurement of particle size of non-radioactive stable isotope tungsten bronze compound according to the present disclosure Test Conditions The particle observation photograph is a HITACHI (JAPAN) S-2400 scanning electron microscope (SEM) image, taken at a magnification of ×50 k to ×100 k at 15 kw.

Result Review

Figure 12:
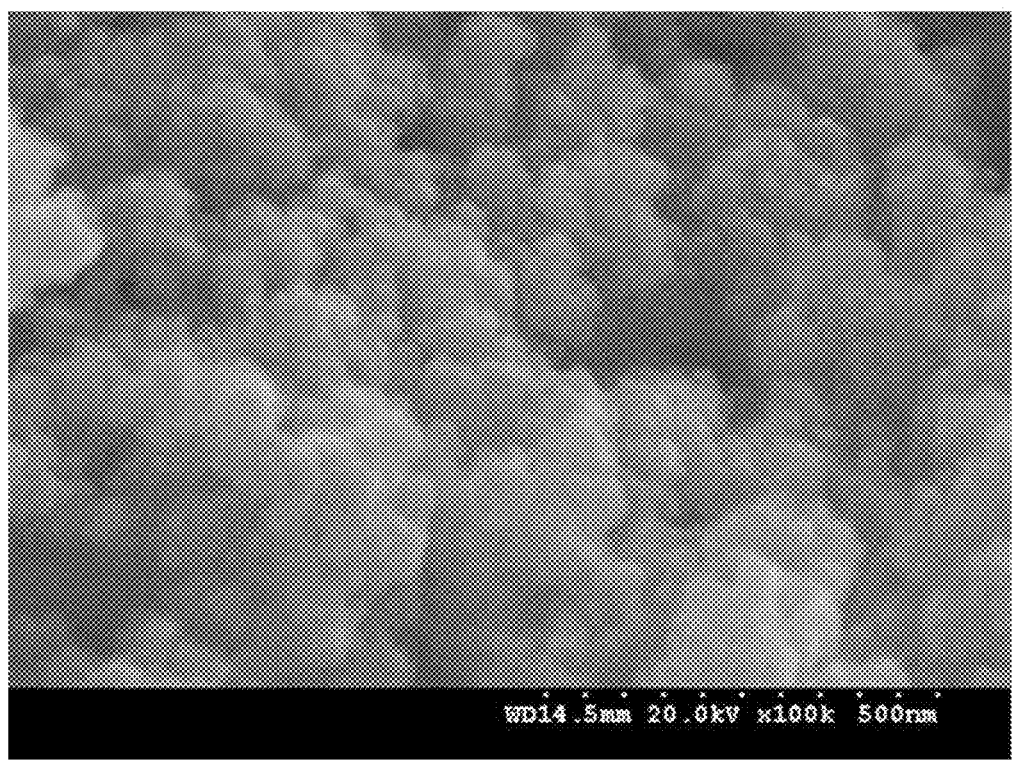
FIG. 12 is an SEM image of non-radioactive stable isotope cesium tungsten oxide $^{(133)}Cs_x^{(182,183,184,186)}WO_{(3-n)}$ particles synthesized by a liquid precipitation method in Example 3.

FIG. 12 is an SEM image of non-radioactive stable isotope cesium tungsten oxide ($^{(133)}$Cs$_x^{(182,183,184,186)}$WO$_{(3-n)}$) particles synthesized by a liquid precipitation method in Example 3. Referring to FIG. 12, it was confirmed in Example 3 that small particles appeared to be agglomerated, but the size per particle unit was observed to be 20-30 nm, and the particle shape was shown to have a uniform spherical shape.

Figure 13:
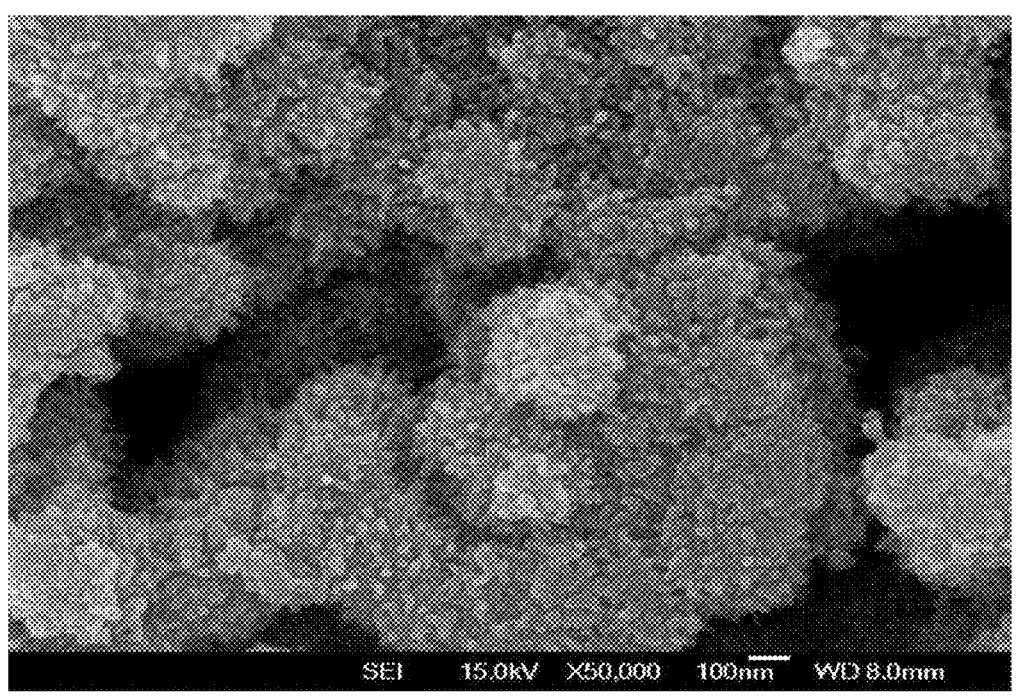
FIG. 13 is an SEM image of non-radioactive stable isotope potassium tungsten oxide $^{(39,41)}K_x^{(182,183,184,186)}WO_{(3-n)}$ particles synthesized by a liquid precipitation method in Example 1.

Whereas, FIG. 13 is an SEM image of non-radioactive stable isotope potassium tungsten oxide ($^{(39,41)}$K$_x^{(182,183,184,186)}$WO$_{(3-n)}$) particles synthesized by a liquid precipitation method in Example 1. Referring to FIG. 13, the particle size of Example 1 was about 100-200 nm and the particle shape was not uniform.

That is, it can be seen that the non-radioactive stable isotope cesium tungsten oxide ($^{(133)}$Cs$_x^{(182,183,184,186)}$WO$_{(3-n)}$), which was generated by replacing the positive element from existing potassium into cesium in the composition of the non-radioactive stable isotope potassium tungsten ($^{(39,41)}$K$_x^{(182,183,184,186)}$WO$_{(3-n)}$), had more favorable results in view of the particle size and the particle shape. Therefore, it could be confirmed that the use of cesium as a positive element is advantageous in preventing the occurrence of a problem of a cloudy appearance due to scattering in the finished heat shielding film by fundamentally blocking haze.

(3) Test 2—Observation of Crystallinity by XRD

Test Purpose

Investigation of hexagonal type crystallinity of non-radioactive stable isotope tungsten bronze compound according to the present disclosure Test Conditions XRD observation was conducted using PHILIPS (Netherlands), X'Pert-MPD system.

Result Review

Figure 14:
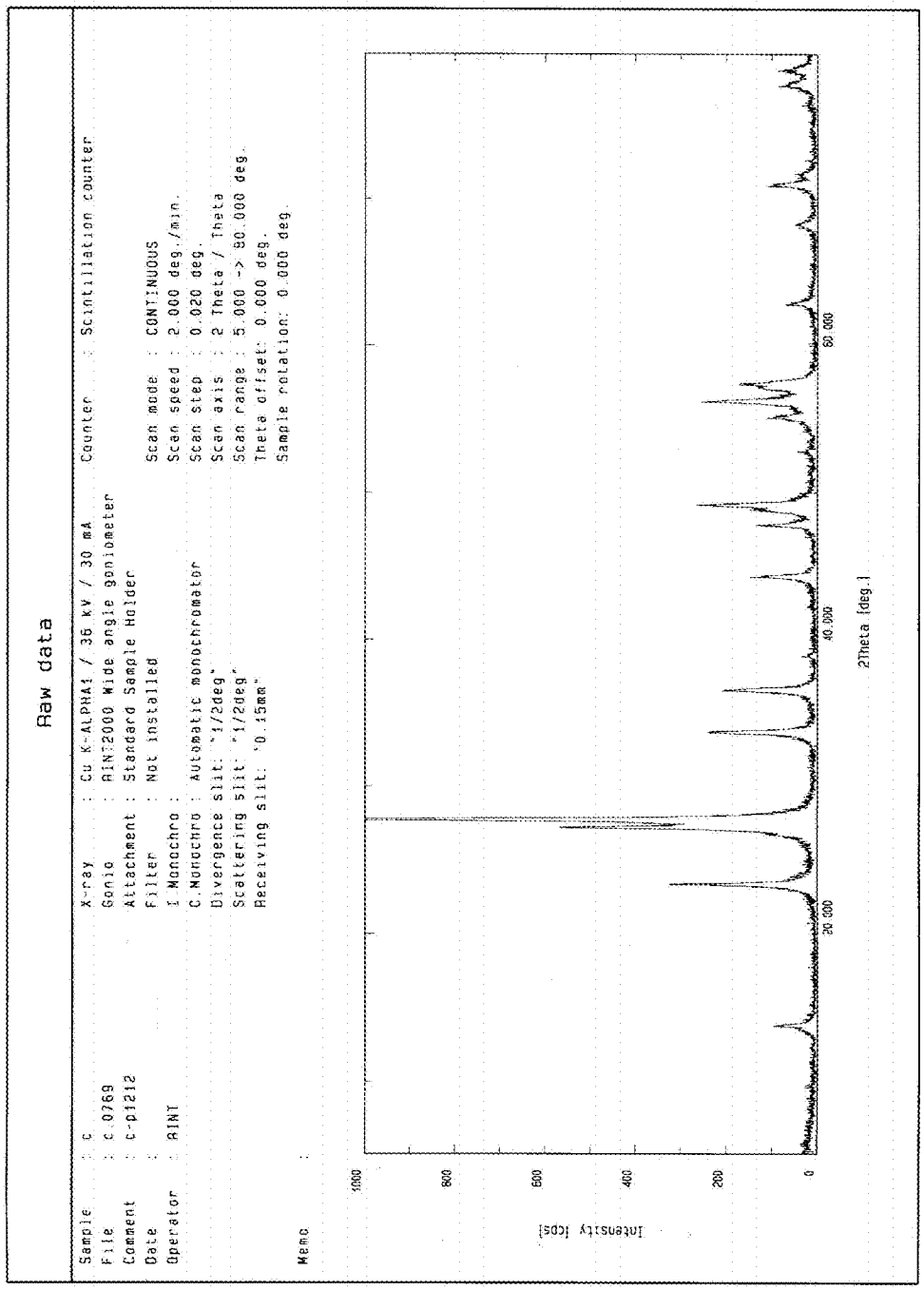
FIG. 14 is an XRD graph showing non-radioactive stable isotope cesium tungsten oxide $^{(133)}Cs_x^{(182,183,184,186)}WO_{(3-n)}$ crystals synthesized by a liquid precipitation method in Example 3.

FIG. 14 is an XRD graph showing non-radioactive stable isotope cesium tungsten oxide ($^{(133)}$Cs$_x^{(182,183,184,186)}$WO$_{(3-n)}$) crystals synthesized by a liquid precipitation method in Example 3. Referring to FIG. 14, the XRD values were 2θ=23.6 in the face (0.0.2), 2θ=28.12 in the face (0.2.0), 2θ=33.82 in the face (1.1.2), and 2θ=36.91 in the face (2.0.2), confirming that the non-radioactive stable isotope cesium tungsten compound ($^{(133)}$Cs$_x^{(182,183,184,186)}$WO$_{(3-n)}$) had hexagonal crystallinity.

That is, as the non-radioactive stable isotope tungsten bronze compound formed an oxygen-deficient $^{(Y)}$A$_x^{(182,183,184,186)}$W$_1$O$_{(3-n)}$) type hexagonal structure, the compound has a relatively small primary particle size, so that the occurrence of a particle size increase problem can be prevented in the firing procedure in the production of compounds and the haze can be fundamentally blocked by small particles, and therefore, a heat shielding film that prevents the occurrence of a cloudy appearance due to scattering in a finished heat shielding film can be provided.

(4) Test 3—Observation of Optical Characteristics, Durability, and Radiation in Everyday Life Test Purpose Evaluation of performance as a living and environment-friendly heat shielding material by comparison of visible light and infrared light transmittance and haze characteristics and observation of durability and radiation in everyday life according to the preparation procedure of non-radioactive stable isotope tungsten bronze compound Test Conditions As for the observation of visible light and infrared light transmittance and haze, the baseline was set in the air by the JASCO(JAPAN) 650 UV/VIS spectrometer. As for the observation of heat resistance and durability, a sample was left at a temperature of 120° C. for 72 hours by using a hot-air drier (SH-DO-149FG) and then was again measured for optical characteristics to show change rates. As for the observation of radiation in everyday life, the intensity of radioactivity emitted when one nucleus is disrupted for 1 second, that is, Becquerel intensity (Bq/m$^3$), was measured by using RD-200 [Radon EYE, pulsed ionization chamber, sensitivity: 0.5 cpm/pci/l, measurement range: 0.1~99.99 pci/l (3700 Bq/m$^3$)].

Result Review

The test results are shown in Table 1 below. (The visible light transmittance indicated the transmittance of 400-780 nm; the infrared light blocking rate was expressed by subtracting 100 from the transmittance of 780-2000 nm; and the haze was expressed as a percentage by dividing the diffuse transmittance (Is) by the total light transmittance (Is+Ir)).

TABLE 1

| Classification | Example 1 | Example 2 | Example 3 | Example 4 | Example 5 | Example 6 | Comparative example 1 | Comparative example 2 |
|---|---|---|---|---|---|---|---|---|
| Visible light transmittance % (380-780 nm) | 68% | 62% | 71% | 67% | 63% | 61% | 69% | 62% |

TABLE 1-continued

| Classification | Example 1 | Example 2 | Example 3 | Example 4 | Example 5 | Example 6 | Comparative example 1 | Comparative example 2 |
|---|---|---|---|---|---|---|---|---|
| Infrared light blocking rate % (780-2000 nm) | 69% | 70% | 91% | 68% | 74% | 76% | 68% | 70% |
| Haze % (380-780 nm) | 0.72% | 0.75% | 0.69% | 0.73% | 0.91% | 1.23% | 1.55% | 1.65% |
| Change rate (ΔT %) | 8% | 9% | 2% | 8% | 2% | 21% | 5% | 10% |
| Becquerel intensity (Bq/m$^3$) | 122.1 Bq/m$^3$ | 51.8 Bq/m$^3$ | 19.98 Bq/m$^3$ | 129.5 Bq/m$^3$ | 118.4 Bq/m$^3$ | 107.3 Bq/m$^3$ | 188.7 Bq/m$^3$ | 225.7 Bq/m$^3$ |

Hereinafter, the disclosure will be described later with reference to Table 1.

Comparative Example 1 was different from Example 1 in that in the composition of the non-radioactive stable isotope potassium tungsten oxide ($^{(39,41)}$K$_x$$^{(182,183,184,186)}$WO$_{(3-n)}$) in Example 1, the existing non-radioactive stable isotope $^{(39,41)}$K was replaced with the radioactive isotope $^{(40)}$K among alkali metal elements. The test results confirmed that Comparative Example 1 using the radioactive isotope, compared with Example 1 using the non-radioactive isotope, showed a high Becquerel intensity, thereby emitting a lot of radiation around the heat shielding film. Therefore, it can be seen that the use of a non-radioactive stable isotope when the heat shielding film is configured is advantageous in preventing the generation of a radioactive material. Furthermore, Example 1 using the non-radioactive stable isotope showed merely a haze value of 0.72%, but Comparative Example 1 showed a haze value of 1.55%, indicating a high value and therefore, it can be confirmed that the use of a non-radioactive stable isotope can block haze due to a relatively small particle size thereof.

Comparative Example 2 was different from Example 2 in that the radioactive sodium tungsten oxide ($^{(24)}$Na$_x$$^{(182,183,184,186)}$WO$_{(3-n)}$) powder was synthesized by replacing the non-radioactive stable isotope $^{(23)}$Na with the radioactive isotope $^{(24)}$Na and applying high power (2,450 MHz) in a microwave furnace instead of a conventional electric furnace in the primary firing. The test results confirmed that relatively little radiation with a Becquerel intensity of 51.8 Bq/m$^3$ was detected in Example 2 using the non-radioactive stable isotope but a greatly high Becquerel intensity of 225.7 Bq/m$^3$ was shown in Comparative Example 2 using the radioactive isotope. Therefore, an environment-friendly heat shielding film emitting less radiation can be configured by using a non-radioactive stable isotope. It was also confirmed that Example 2 showed a lower haze value than Comparative Example 2, and thus the use of the non-radioactive stable isotope prevented the occurrence of a cloudy appearance due to scattering in the finished heat shielding film.

In Comparative Example 2, the high power (2,450 MHz) was applied by the microwave furnace instead of an existing electric furnace in the primary calcining, and therefore, due to high energy, heat energy is generated by frictional heat generated by the rotation and vibration of intramolecular dipoles of a polar material during calcining, and molecules and elements are in an unstable state due to billions of polarity changes per second, and thus the radioactive isotopes are understood to produce instantaneous or trace amounts of radioactive isotopes more due to the generation of artificial energy between molecules or elements. In addition, the energy inside the material become 1000° C. or higher, resulting in agglomeration of particles, with the result that the size of particles is increased and the haze value of the final film is increased.

Example 3 was different from Example 1 in that in the non-radioactive stable isotope tungsten bronze compound, cesium ($^{133}$Cs) was used as a positive element in Example 3 and potassium ($^{(39,41)}$K) was used as a positive element in Example 1.

As a result, Example 3 showed a lower Becquerel intensity than Example 1, and thus has relatively high stability against radiation in everyday life, and the use of cesium ($^{133}$Cs) compared with potassium ($^{(39,41)}$K) as a positive element showed high visible light transmittance, especially greatly improved the infrared light blocking rate, and had relatively excellent heat resistance and durability.

Example 3 was different from Example 2 in that in the non-radioactive stable isotope tungsten bronze compound, the positive element is composed of cesium ($^{133}$Cs) in Example 3 and the positive element is composed of sodium ($^{23}$Na) in Example 2.

As shown in Table 1, the results confirmed that the use of cesium ($^{133}$Cs) compared with sodium ($^{23}$Na) as a positive element was advantageous in view of the improvement of optical characteristics. There are relative differences in heat resistance and durability, and even in these cases, the use of cesium ($^{133}$Cs) as a positive element was more advantageous.

Example 3 was different from Example 4 in that in the reduction firing step of the non-radioactive stable isotope tungsten bronze compound, nitrogen gas was used and zinc was used as an organic acid metal chelate in Example 3, and argon gas was used in the reduction firing step and copper was used as an organic metal chelate in Example 4.

As a result, the visible light transmittance and infrared light blocking rate were degraded and the heat resistance and durability were also degraded in Example 4 compared with Example 3.

Example 3 was different from Example 5 in that the content of the organic acid zinc chelate was 5 wt % in Example 3, but the content of the organic acid zinc chelate was 10 wt % in Example 5.

The results verified that when the content of the organic acid metal chelate is increased, optical characteristics tend to be slightly degraded, but the heat resistance and durability are maintained excellent.

When comparing Example 3 with Example 6, Example 3 contained an organic acid metal chelate and Example 6 excluded such an organic acid metal chelate. In Example 6 in which an organic acid chelate was not added, excellent visible light transmittance was shown but there were great problems with respect to heat resistance and durability.

That is, it can be seen that in order to supplement the heat resistance and durability of the non-radioactive stable isotope tungsten bronze compound having excellent optical characteristics, an organic acid metal chelate needs to be added to block a reaction by the introduction of residual oxygen (O, $O_2$), a reaction by a residual hydroxyl group (—OH), a reaction by a residual radical, and the like.

The above detailed description illustrates an example of the present disclosure. In addition, the above description relates to a preferred embodiment of the present disclosure, and the present disclosure may be used in various other combinations, modifications, and environments. That is, the present disclosure may be changed or modified within the scope of the concept of the disclosure disclosed in the present specification, the scope equivalent to the disclosed content, and/or the scope or technique or knowledge of the art. The above-described embodiment illustrates the best mode for carrying out the technical idea of the present disclosure, and various modifications required for a specific application field and usage of the present disclosure are possible. Therefore, the detailed description of the disclosure above is not intended to limit the present disclosure to the disclosed embodiment. Further, the appended claims must be construed to encompass other embodiments.

What is claimed is:

1. An environment-friendly heat shielding film using a non-radioactive stable isotope, the environmental-friendly heat shielding film comprising:
   a substrate layer; and
   a heat shielding layer formed on one surface of the substrate layer, the heat shielding layer containing a non-radioactive stable isotope tungsten bronze compound being deficient in oxygen, the heat shielding layer comprising a passivation film containing an organic acid metal chelate compound for improving heat resistance and durability of the oxygen-deficient non-radioactive stable isotope tungsten bronze compound;
   the non-radioactive stable isotope tungsten bronze compound forming a $^{(Y)}A_x^{(182,183,184,186)}W_1O_{(3-n)}$, wherein the $^{(Y)}A$ is a non-radioactive stable isotope;
       the X is the number of elements doped to the $^{(Y)}A$ according to reduction calcination;
       the Y is a mass number of A;
       the (3-n) is lack of oxygen; and
       the (Y)A is a non-radioactive alkali metal element or a non-radioactive alkali earth metal element,
   wherein the organic acid metal chelate compound has a structure of R1-M-R2 in which M is any one element of Cu, Ag, Zn, Ni, W, and Co; and R1 and R2 each are any one of glutamic acid and sodium polyaspartate.

2. The environmental-friendly heat shielding film of claim 1, wherein the non-radioactive stable isotope tungsten bronze compound includes hexagonal structure.

3. The environmental-friendly heat shielding film of claim 1, wherein the $^{(Y)}A$ is any one of $^{(23)}Na$, $^{(39,41)}K$, $^{(85)}Rb$, $^{(133)}Cs$, $^{(24,25,26)}Mg$, and $^{(42,43,44)}Ca$.

4. The environmental-friendly heat shielding film of claim 1, wherein the non-radioactive stable isotope tungsten bronze compound is formed in an amorphous form by calcining a non-radioactive stable isotope tungsten bronze hydrate in the range of 300-600° C. to remove hydroxyl groups and water molecules.

5. The environmental-friendly heat shielding film of claim 4, wherein, after the calcining, the non-radioactive stable isotope tungsten bronze compound forms an oxygen-deficient $^{(Y)}A_x^{(182,183,184,186)}W_1O_{(3-n)}$ type hexagonal structure by reduction firing through the introduction of an inert gas.

6. The environmental-friendly heat shielding film of claim 5, wherein the inert gas includes at least one of $N_2$, Ar, Ne, and $CO_3$.

7. The environmental-friendly heat shielding film of claim 1, wherein the substrate layer is formed of polyethylene terephthalate.

8. An environment-friendly heat shielding film using a non-radioactive stable isotope, the environmental-friendly heat shielding film comprising:
   a substrate layer;
   a heat shielding layer formed on one surface of the substrate layer, wherein the heat shielding layer contains a non-radioactive stable isotope tungsten bronze compound; and
   a passivation film containing an organic acid chelate compound, wherein the organic acid metal chelate compound has a structure of R1-M-R2 in which M is any one element of Cu, Ag, Zn, Ni, W, and Co; and R1 and R2 each are any one of glutamic acid and sodium polyaspartate.

* * * * *